(12) United States Patent
Kim

(10) Patent No.: US 11,682,189 B2
(45) Date of Patent: Jun. 20, 2023

(54) SPIRAL FEATURE SEARCH

(71) Applicant: Microsoft Technology Licensing, LLC, Redmond, WA (US)

(72) Inventor: Taemin Kim, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/379,663

(22) Filed: Jul. 19, 2021

(65) Prior Publication Data

US 2023/0024185 A1 Jan. 26, 2023

(51) Int. Cl.
*G06V 10/44* (2022.01)
*G06V 10/25* (2022.01)

(52) U.S. Cl.
CPC .............. *G06V 10/44* (2022.01); *G06V 10/25* (2022.01)

(58) Field of Classification Search
CPC ................................ G06V 10/44; G06V 10/25
See application file for complete search history.

(56) References Cited

U.S. PATENT DOCUMENTS

| | | | | |
|---|---|---|---|---|
| 5,681,602 | A * | 10/1997 | Alden | A23L 23/00 426/94 |
| 6,955,110 | B1 * | 10/2005 | Spletzer | A22C 17/0006 83/342 |
| 6,975,755 | B1 * | 12/2005 | Baumberg | G06T 7/97 348/42 |
| 8,503,742 | B2 | 8/2013 | Dewaele et al. | |
| 8,861,864 | B2 | 10/2014 | Hong et al. | |
| 9,165,345 | B2 | 10/2015 | Hutchison et al. | |
| 10,552,709 | B2 | 2/2020 | Fua et al. | |
| 2002/0051572 | A1 * | 5/2002 | Matsumoto | G06V 10/752 382/190 |
| 2003/0215867 | A1 * | 11/2003 | Gulati | G06T 7/12 435/6.1 |
| 2013/0322762 | A1 * | 12/2013 | Zeng | G06V 10/457 382/218 |

FOREIGN PATENT DOCUMENTS

| | | | |
|---|---|---|---|
| EP | 3582177 A1 | 12/2019 | |
| JP | 3764364 B2 * | 4/2006 | .......... G06K 9/4604 |
| WO | 2012136642 A1 | 10/2012 | |

OTHER PUBLICATIONS

Huang, et al., "High-Performance SIFT Hardware Accelerator for Real-Time Image Feature Extraction", In Journal of IEEE Transactions on Circuits and Systems for Video Technology, vol. 22, Issue 3, Jul. 21, 2011, pp. 340-351.

(Continued)

*Primary Examiner* — Pinalben Patel
(74) *Attorney, Agent, or Firm* — Workman Nydegger

(57) ABSTRACT

A computing system configured to identify a region of interest in an image having a plurality of pixels, each of which corresponds to a feature score. The region of interest is a section of the image where feature points reside. The computing system is also configured to traverse one or more pixels in the region of interest in a spiral sequence starting from a center of the region of interest to edges of the region of interest to determine whether the corresponding pixel is a feature point.

12 Claims, 24 Drawing Sheets

(56) References Cited

OTHER PUBLICATIONS

Kroupis, et al., "A Modified Spiral Search Algorithm and its Embedded System Architecture Design", In International Journal of Computer and Information Engineering, vol. 2, Issue 11, Nov. 27, 2008, pp. 3997-4003.

Hosny, et al., "Fast Computation of Orthogonal Fourier-Mellin Moments in Polar Coordinates", In Journal of Real-Time Image Processing, vol. 6, Issue 2, Jun. 6, 2011, pp. 73-80.

Lee, Moon-Kyu, "Evaluation of Scanning Methods for Target Detection", In Journal of Institute of Control, Robotics and Systems, vol. 19, Issue 1, Jan. 1, 2013, pp. 72-79.

"International Search Report and Written Opinion issued in PCT Application No. PCT/US2022/032413", dated Sep. 28, 2022, 10 Pages.

Yam, et al., "Effective Bi-directional People Flow Counting for Real Time Surveillance System", In Proceedings of IEEE International Conference on Consumer Electronics, Jan. 9, 2011, pp. 863-864.

"Python—Calculate Pixel Distance from Centre of Image", Retrieved From: https://stackoverflow.com/questions/66412818/calculate-pixel-distance-from-centre-of-image, Mar. 1, 2021, 3 Pages.

\* cited by examiner

400A

| Sequence | (x, y) Coordinates in a pizza slice | Squared Norm = $x^2 + y^2$ |
|---|---|---|
| 1 | (0, 0) | 0 |
| 2 | (1, 0) | 1 |
| 3 | (0, 1) | 1 |
| 4 | (-1, 0) | 1 |
| 5 | (0, -1) | 1 |
| 6 | (1, 1) | 2 |
| 7 | (-1, 1) | 2 |
| 8 | (-1, -1) | 2 |
| 9 | (1, -1) | 2 |
| 10 | (2, 0) | 4 |
| ... | ... | ... |

*Fig. 4A*

| Sequence | (x, y) Coordinates in a pizza slice | Squared Norm = $x^2 + y^2$ |
|---|---|---|
| 1 | (0, 0) | 0 |
| 2 | (1, 0) | 1 |
| 3 | (1, 1) | 2 |
| 4 | (2, 0) | 4 |
| 5 | (2, 1) | 5 |
| 6 | (2, 2) | 8 |
| 7 | (3, 0) | 9 |
| 8 | (3, 1) | 10 |
| 9 | (3, 2) | 13 |
| 10 | (4, 0) | 16 |
| ... | ... | ... |

| Sequence | (x, y) Coordinates in a pizza slice | Squared Norm = $x^2 + y^2$ | y = x | y = 0 | Position of the Pixel Point |
|---|---|---|---|---|---|
| 1 | (0, 0) | 0 | True | True | Center Point |
| 2 | (1, 0) | 1 | False | True | Axial Point |
| 3 | (1, 1) | 2 | True | False | Diagonal Point |
| 4 | (2, 0) | 4 | False | True | Axial Point |
| 5 | (2, 1) | 5 | False | False | Interior Point |
| 6 | (2, 2) | 8 | True | False | Diagonal Point |
| 7 | (3, 0) | 9 | False | True | Axial Point |
| 8 | (3, 1) | 10 | False | False | Interior Point |
| 9 | (3, 2) | 13 | False | False | Interior Point |
| 10 | (4, 0) | 16 | False | True | Axial Point |
| ... | ... | ... | ... | ... | ... |

| Sequence | (x, y) Coordinates | Maximum Norm = Max {|x|, |y|} |
|---|---|---|
| 1 | (0, 0) | 0 |
| 2 | (1, 0) | 1 |
| 3 | (0, -1) | 1 |
| 4 | (-1, 0) | 1 |
| 5 | (0, 1) | 1 |
| 6 | (1, 1) | 1 |
| 7 | (1, -1) | 1 |
| 8 | (-1, -1) | 1 |
| 9 | (-1, 1) | 1 |
| 10 | (2, 0) | 2 |
| ... | ... | ... |

| Sequence | (x, y) Coordinates in a pizza slice | Maximum Norm = Max {|x|, |y|} |
|---|---|---|
| 1 | (0, 0) | 0 |
| 2 | (1, 0) | 1 |
| 3 | (1, 1) | 1 |
| 4 | (2, 0) | 2 |
| 5 | (2, 1) | 2 |
| 6 | (2, 2) | 2 |
| 7 | (3, 0) | 3 |
| 8 | (3, 1) | 3 |
| 9 | (3, 2) | 3 |
| 10 | (3, 3) | 3 |
| ... | ... | ... |

| Sequence | (x, y) Coordinates in a pizza slice | Maximum Norm = Max {|x|, |y|} | y = x | y = 0 | Position of the Pixel Point |
|---|---|---|---|---|---|
| 1 | (0, 0) | 0 | True | True | Center Point |
| 2 | (1, 0) | 1 | False | True | Axial Point |
| 3 | (1, 1) | 1 | True | False | Diagonal Point |
| 4 | (2, 0) | 2 | False | True | Axial Point |
| 5 | (2, 1) | 2 | False | False | Interior Point |
| 6 | (2, 2) | 2 | True | False | Diagonal Point |
| 7 | (3, 0) | 3 | False | True | Axial Point |
| 8 | (3, 1) | 3 | False | False | Interior Point |
| 9 | (3, 2) | 3 | False | False | Interior Point |
| 10 | (3, 3) | 3 | True | False | Diagonal Point |
| ... | ... | ... | ... | ... | ... |

*Fig. 7C*

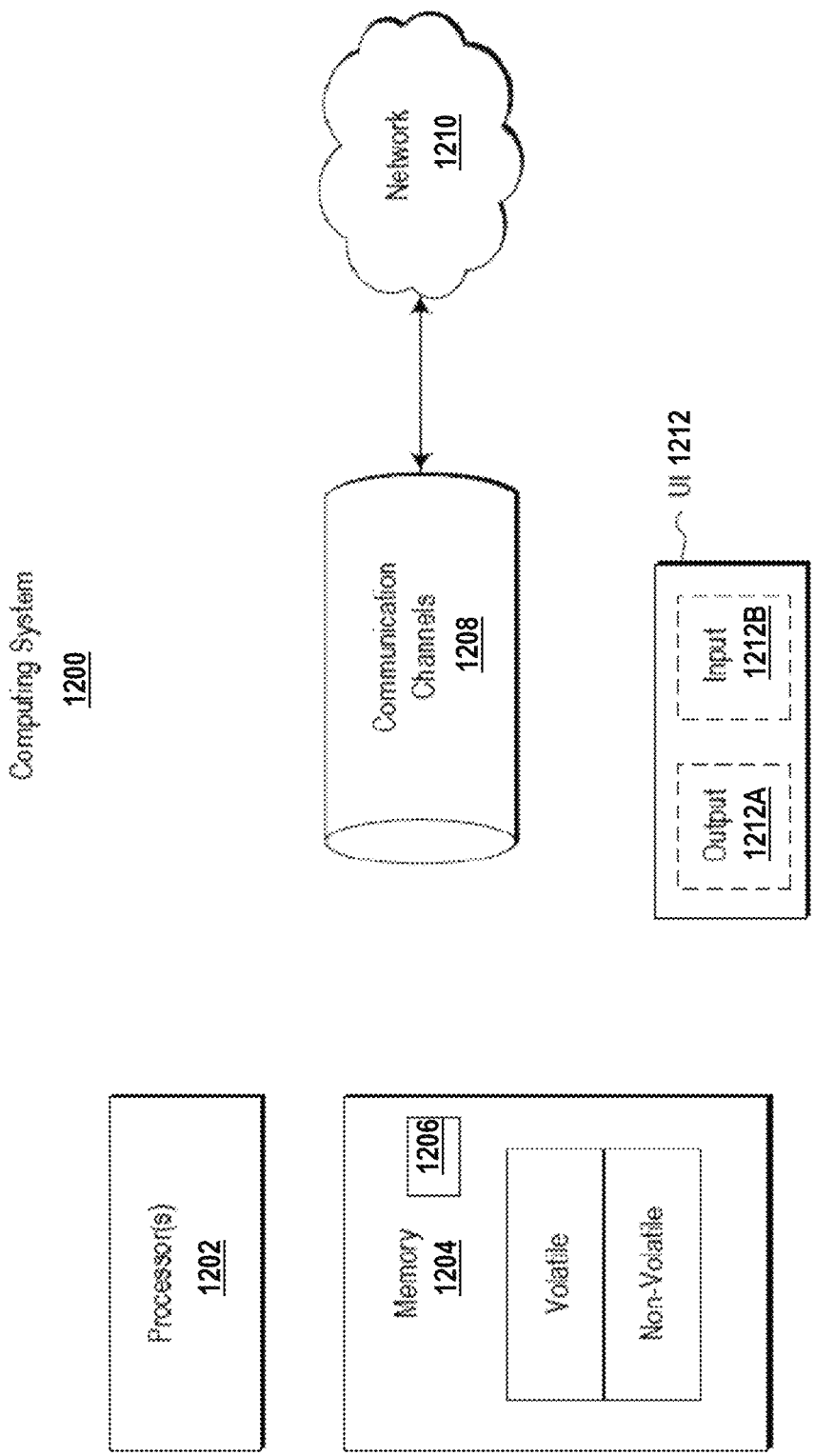

SPIRAL FEATURE SEARCH

BACKGROUND

Feature detection and/or feature matching are important components of many computer vision applications. For example, users may wish to align two images so that they can be seamlessly stitched into a composite mosaic. As another example, users may wish to establish a dense set of correspondences so that a three-dimensional model can be also constructed or an in-between view can be generated. In either case, a set of features are detected and then matched in order to establish such an alignment or a set of correspondence. Features may include (but are not limited to) specific locations in the images, such as mountain peaks, building corners, doorways, interestingly shaped patches of objects, and/or edges.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to efficiently identifying local features of an image, and specifically to a feature detection method spirally sweeping from the central region of interest and expanding outwardly, which significantly improves the computational efficiency compared to the traditional brute-force methods. In particular, a region of interest in an image often contains the feature point around its center, which can be generally represented by a normal distribution that characterizes the probabilistic concentration of the feature occurrence. The spiral search starts from the center of a region of interest in an image, which significantly increases the likelihood of finding a feature before traversing the entire region of interest. As such, the expected time of the spiral feature search is drastically improved compared to the traditional brute-force search. Because the expected time of the brute-force search is the same regardless of the probabilistic distributions of feature occurrence. Thus, the spiral feature search can speed up the process of finding feature points significantly, which in turn reduces power consumption of computer devices (e.g., head-mounted devices, mobile devices), and increases the accuracy of aligned imagery for various applications.

In some embodiments, a computing system is configured to identify a local feature point in a region of interest in an image. The region of interest is a midsection of the image having a plurality of pixels, of which a feature point (also referred to as feature) resides around the center. The computing system is configured to compute a feature score for each of the plurality of pixels (e.g., a function of pixel values in its neighborhood). The computing system is also configured to traverse each pixel in the region of interest in a predefined sequence to determine whether it is a local feature based on the feature score. The predefined sequence is a spiral sequence starting from the center of the region of interest outwardly toward its edges. In response to determining local features, their locations may be further refined to subpixel accuracy and/or their feature descriptors may be extracted. Subpixel accuracy is referred to techniques that use additional information to infer a more accurate location of a feature point with higher accuracy that is finer than that of the pixel width, e.g., at a fraction of the pixel size.

In an embodiment, the predefined sequence is recorded in a lookup table. In another embodiment, a full lookup table records a sequence of relative pixel coordinates in a region of interest sorted by their distance from its center (also referred to as norm).

In the other embodiment, a reduced lookup table stores only a sorted sequence of points in half a quadrant of the region of interest (also referred to as pizza slice), which significantly reduces the amount of computer-readable storage to store the sequence. In such a case, the computing system is further configured to obtain the full sequence by symmetric transformations of the points in the reduced lookup table.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 4A illustrates an example of a full lookup table containing a sequence of all pixel points in the region of interest sorted by their squared norm;

FIG. 4B illustrates an example of a reduced lookup table containing only pixel points in the reference pizza slice sorted by their squared norm;

FIG. 4C illustrates another example of a reduced lookup table containing pixel points in the reference pizza slice and their corresponding positions (e.g., whether each pixel point is a center point, an axial point, a diagonal point, or an interior point);

FIG. 7A illustrates an example of a full lookup table containing pixels sorted by their maximum norms in a region of interest;

FIG. 7B illustrates an example of a reduced lookup table containing only pixel points in the reference pizza slice sorted by their maximum norms;

FIG. 7C illustrates another example of a reduced lookup table containing pixel points in the reference pizza slice and their corresponding positions (e.g., whether the point is a center point, an axial point, a diagonal point, or an interior point);

FIG. 12 illustrates an example computing system in which the principles described herein may be employed.

DETAILED DESCRIPTION

Figure 1:
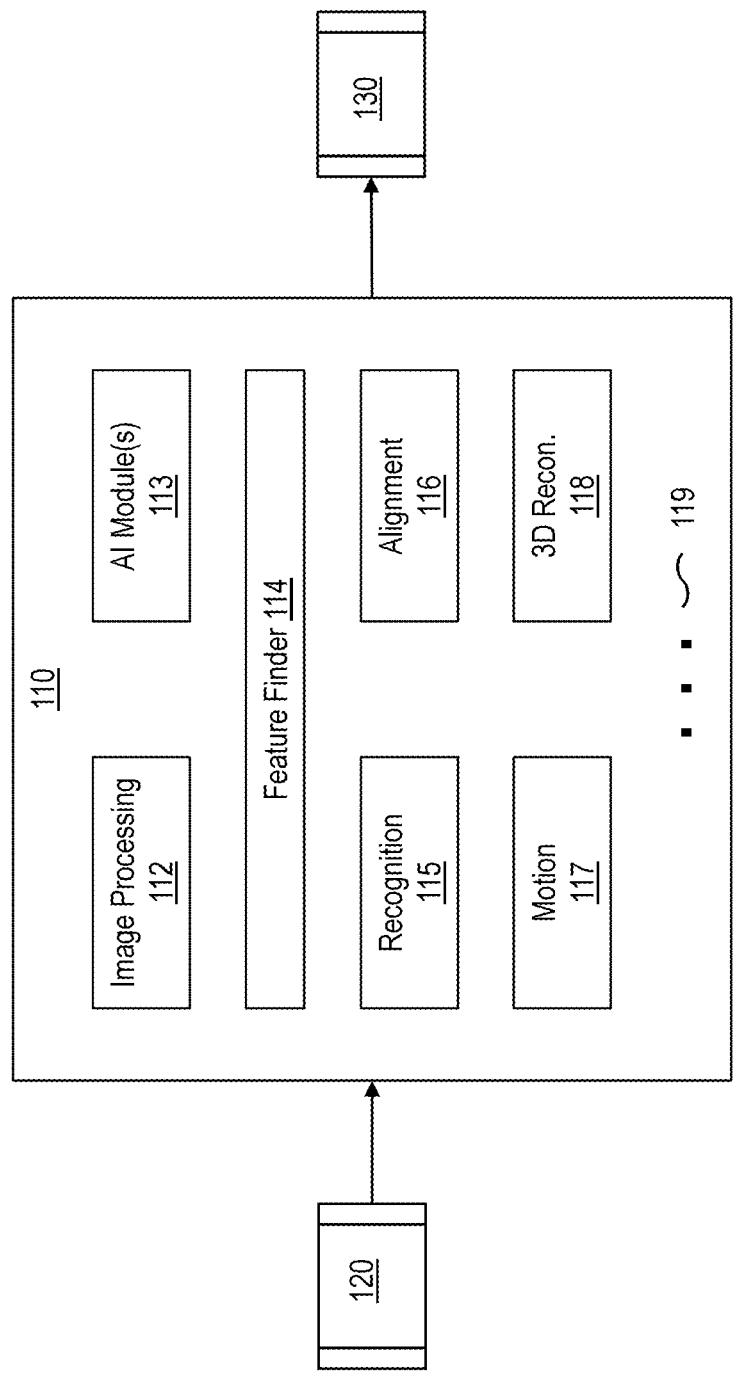
FIG. 1 illustrates an example of a computing system configured to process images and detect features from the images.

Feature detection and feature matching are important components of many computer vision applications, including (but not limited to) image editing, rapid target acquisition, motion detection, three-dimensional object reconstruction, head tracking in head-mounted devices, virtual reality generation, augmented reality generation, object recognition, and/or many artificial intelligence (AI) models trained for various purposes. Such applications may be implemented at a computer system, including (but not limited to) a personal computer, a laptop, a camera, a mobile device, a head-mounted device. For example, users may wish to align two images so that they can be seamlessly stitched into a composite mosaic. As another example, users may wish to establish a dense set of correspondences so that a three-dimensional (3D) model may be constructed or an in-between view may be generated. Some features may be specific locations in the images, such as mountain peaks, building corners, doorways, or interesting shaped patches of objects. Other features may be edges, such as a profile of buildings against the sky. In some cases, the edges may be grouped into longer curves and contours, which can then be tracked. Alternatively or in addition, edges may also be grouped into straight line segments, which can then be matched and analyzed to achieve other purposes.

In the process of detecting features, a feature score of a pixel is often required to be identified in an image or a section of an image (e.g., a region of interest). The feature score of a pixel is a function of pixel values in its local neighborhood. It is often related to the colors of pixels. In a case, the feature score is one or more numeric values that take various colors, e.g., grayscale color values, RGB (red, green, blue) color values. In the other case, the feature score is derived from the numeric values that take various colors. For example, a raw image (having an original set of values for pixels) may first be processed and transformed into another image (having a new set of feature scores for pixels). The processed image may then be further processed to identify the features (e.g., local maxima and/or local minima), and the identified features may be further refined to subpixel accuracy and/or be used to extract their feature descriptors.

Traditionally, the brute-force search methods often traverse all pixels from one edge to the other one edge in a region of interest (e.g., from the left to right and top to bottom) to detect local features. In general, a region of interest is often centered at a feature candidate around which a feature point resides. The principles described herein disclose an improved method to identify a feature point by traversing pixels in the region of interest in an outward spiral sequence from its center towards its boundary.

The spiral search starts from the center of a region of interest in an image, which significantly increases the likelihood of finding a feature before traversing the entire region. In general, the probabilistic concentration of the feature occurrence can be characterized by a normal distribution. Notably, the expected time of the spiral search is drastically improved while the traditional brute-force method takes the same time regardless of the probabilistic distributions of feature occurrence.

In particular, the spiral feature search significantly speeds up the process of finding features, which in turn reduces power consumption of computer devices (e.g., head-mounted devices, mobile devices), and improves the usability of feature-based imagery for various applications.

FIG. 1 illustrates an example of a computing system 110 that implements the principles described herein. The computing system 110 is configured to receive images 120 and process the received image 120 to generate one or more results 130. The one or more results 130 may be associated with (but are not limited to) object recognition, alignment, motion detection, and 3-dimension (3D) object reconstruction. As illustrated, the computing system 110 includes an image processing module 112, an artificial intelligence module(s) 113, a feature finder 114, an object recognition module 115, an alignment module 116, a motion detection module 117, and/or a 3D object reconstruction model. In some embodiments, the computing system 110 may include additional modules or only include a subset of modules illustrated in FIG. 1. The ellipsis 119 represents that there may be any number of modules implemented at the computing system 110.

The image processing module 112 is configured to process raw images to enhance or transform the raw images. The AI model(s) 113 include (but are not limited to) models trained by various machine learning techniques to perform various tasks. The machine learning techniques include supervised learning, unsupervised learning, semi-supervised learning, deep neural networks, convolutional neural networks, and a combination thereof. For example, supervised learning techniques include (but are not limited to) nearest neighbors, Bayesian classification, logistic regression, support vector machines, decision trees, and/or forests; unsupervised learning techniques include (but are not limited to) clustering, k-means, Gaussians mixture models, principal component analysis, and/or manifold learning. The object recognition module 115 is configured to identify one or more objects in images 120. The alignment module 116 is configured to align one image with another image. The motion detection module 117 is configured to detect certain motions of objects (e.g., a person, a vehicle) in a sequence of images (e.g., a video). The 3D reconstruction module 118 is configured to reconstruct a 3D object from multiple images in which the same objects may be taken at different angles.

The feature finder 114 is configured to find features (e.g., feature points) in images 120. The detected features may then be used by the AI module(s) 113, the object recognition module 115, the alignment module 116, the motion detection module 117, and/or the 3D reconstruction module 118 to generate desired results 130.

Figure 2:
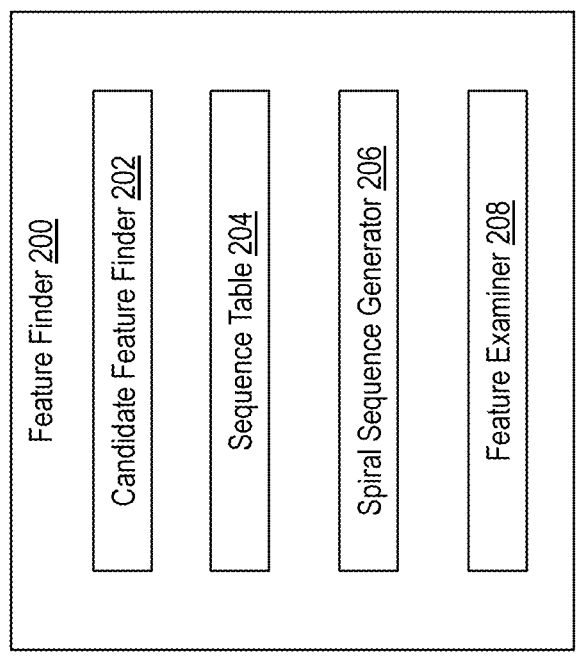
FIG. 2 illustrates an example of a feature finder in FIG. 1.

FIG. 2 illustrates an example of a feature finder 200 that corresponds to the feature finder 114 of FIG. 1. The feature finder 200 is configured to traverse pixels in a region of interest from its center outwardly to its edges in a spiral sequence. In an embodiment, the feature finder 200 includes a candidate feature finder 202, a sequence table 204, a sequence generator 206, and a feature examiner 208. The candidate feature finder 202 is configured to identify feature point candidates. In the other embodiment, the candidate feature finder 202 is further configured to define regions of interest in an image. For example, in some embodiments, the candidate feature finder 202 determines the location and dimension(s) of the region of interest, such as 50×50 or 10×10. Generally, the region of interest includes an odd number of pixels in each of the width or height dimension, as such, the center point of the region of interest overlaps the center pixel. Although when the region of interest includes an even number of pixels in the width and/or height dimensions, the principles described herein are also applicable.

The sequence table 204 stores a sequence of a plurality of pixels in a region of interest. The sequence generator 206 is configured to generate a full spiral sequence to traverse all pixels in a region of interest. The feature examiner 208 is configured to traverse each of the pixels in the region of interest, check the feature scores in its neighborhood, and determine whether it is a local feature (also referred to as a local feature point, feature point, or feature). For the identified feature points, their locations may be further refined to subpixel accuracy and/or their feature descriptors may be extracted.

In an embodiment, the sequence table 204 stores a plurality of pixel points sorted by their norms in the region of interest. In another embodiment, the Euclidean norm (i.e., $x^2+y^2$, where x and y correspond to x and y coordinates of the pixel, respectively) is employed. In the other embodiment, the maximum norm (i.e., $\max\{|x|, |y|\}$) is employed.

Figure 3A:
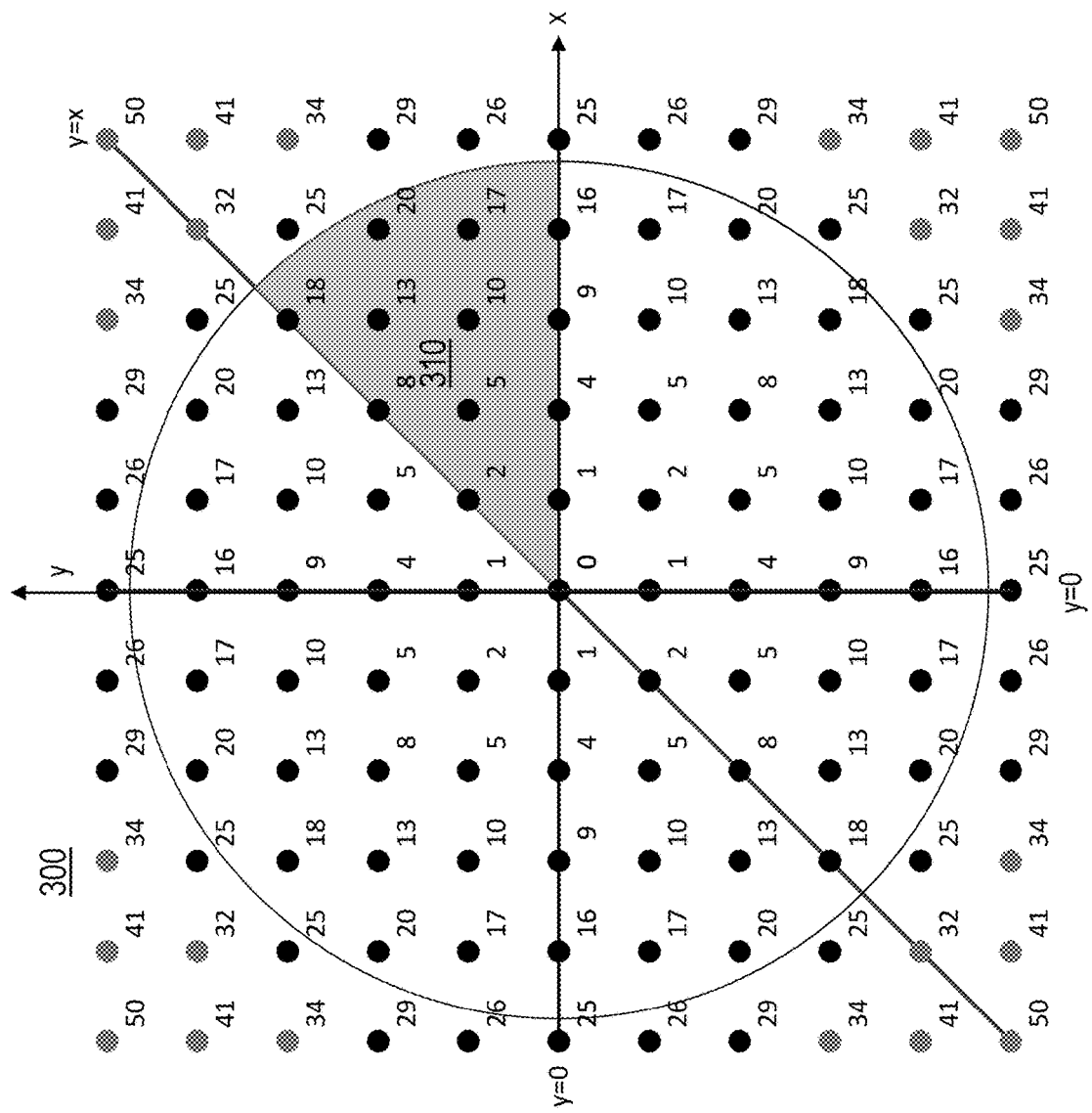
FIG. 3A illustrates a region of interest having a plurality of points in the x-y plane.

FIG. 3A illustrates a region of interest having a plurality of pixels in the square lattice or in the x-y plane 300. Each black dot represents a pixel in the region of interest. For example, the pixel at (0, 0) overlaps the center point of the region of interest (also referred to as a center pixel). Each number next to a pixel represents its squared norm. For other examples, the pixel at (0, 1) has 1 ($=0^2+1^2$), the pixel at (1, 1) has 2 ($=1^2+1^2$), the pixel at (2, 1) has 5 ($=2^2+1^2$), and so on and so forth. As such, the squared norm of each pixel is computed in the x-y plane 300.

Notably, pixels in each quadrant of the x-y plane 300 are symmetric about axes and diagonal lines (e.g., lines y=0, x=0, y=x, and/or y=−x). From the pixels in the reference pizza slice (e.g., the shaded pizza slice 310), the rest pixels in the remaining seven pizza slices may be generated by symmetric transformations. Hereinafter, an axial pixel or point is a pixel point that lies on an axis of coordinate such as x-axis (i.e., line y=0), or y-axis (i.e., line x=0); a diagonal pixel or diagonal point is a pixel point that lies on a diagonal line such as line y=x or y=−x; an interior pixel or point is a pixel point that does not lie on an axis of coordinate or a diagonal line.

Figure 3B:
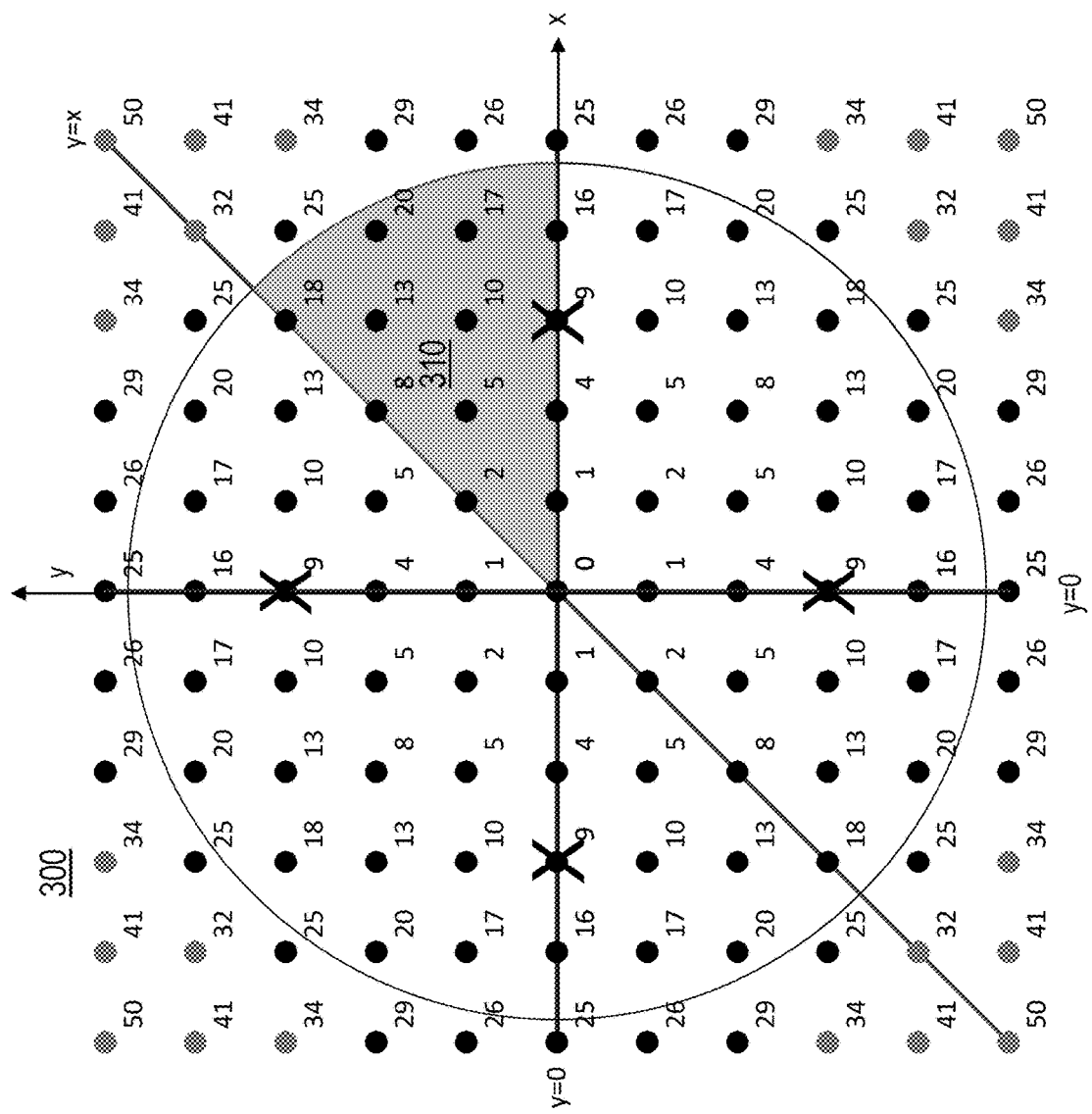
FIG. 3B illustrates that for each axial point that lies on the line y=0 in the reference pizza slice, the other three axial points in symmetry that lie on the line y=0 or x=0 can be identified in the remaining three quadrants.

In particular, referring to FIG. 3B, for each axial pixel in the reference pizza slice 310, the other three axial pixels in symmetry can be identified in the remaining three quadrants, and their norms are the same as that of the axial pixel in the reference pizza slice 310. For example, the axial pixel at (3, 0) in the reference pizza slice 310 has three symmetric axial pixels at (0, 3), (−3, 0), and (0, −3) in the remaining three quadrants. As the squared norm of the axial pixel at (3, 0) is 9, those of the other symmetric axial pixels at (0, 3), (−3, 0), and (0, −3) are also 9.

Figure 3C:
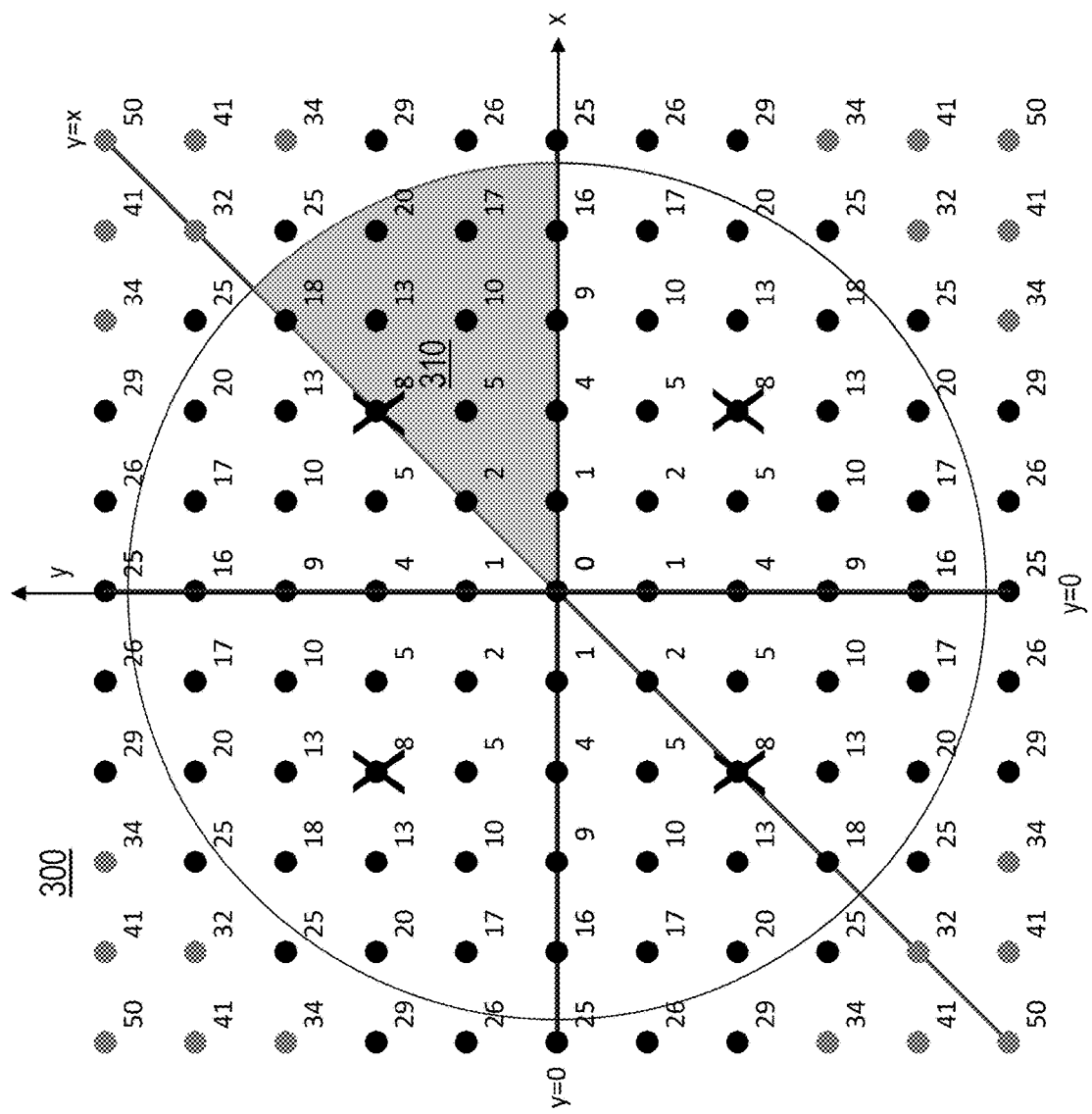
FIG. 3C illustrates that for each diagonal point that lies on the line y=x in the reference pizza slice, the other three diagonal points in symmetry that lie on the line y=x or y=−x can be identified in the remaining three quadrants.

Similarly, referring to FIG. 3C, for each diagonal pixel in the reference pizza slice 310, the other three diagonal pixels in symmetry can be identified in the remaining three quadrants, and their norms are the same as that of the diagonal pixel in the reference pizza slice 310. For example, the diagonal pixel at (2, 2) in the reference pizza slice 310 has the other three diagonal pixels in symmetry at (−2, 2), (−2, −2), (2, −2) in the remaining three quadrants. As the squared norm of the diagonal pixel at (2, 2) is 8, those of the other diagonal pixels in symmetry at (−2, 2), (−2, −2), (2, −2) are also 8.

Figure 3D:
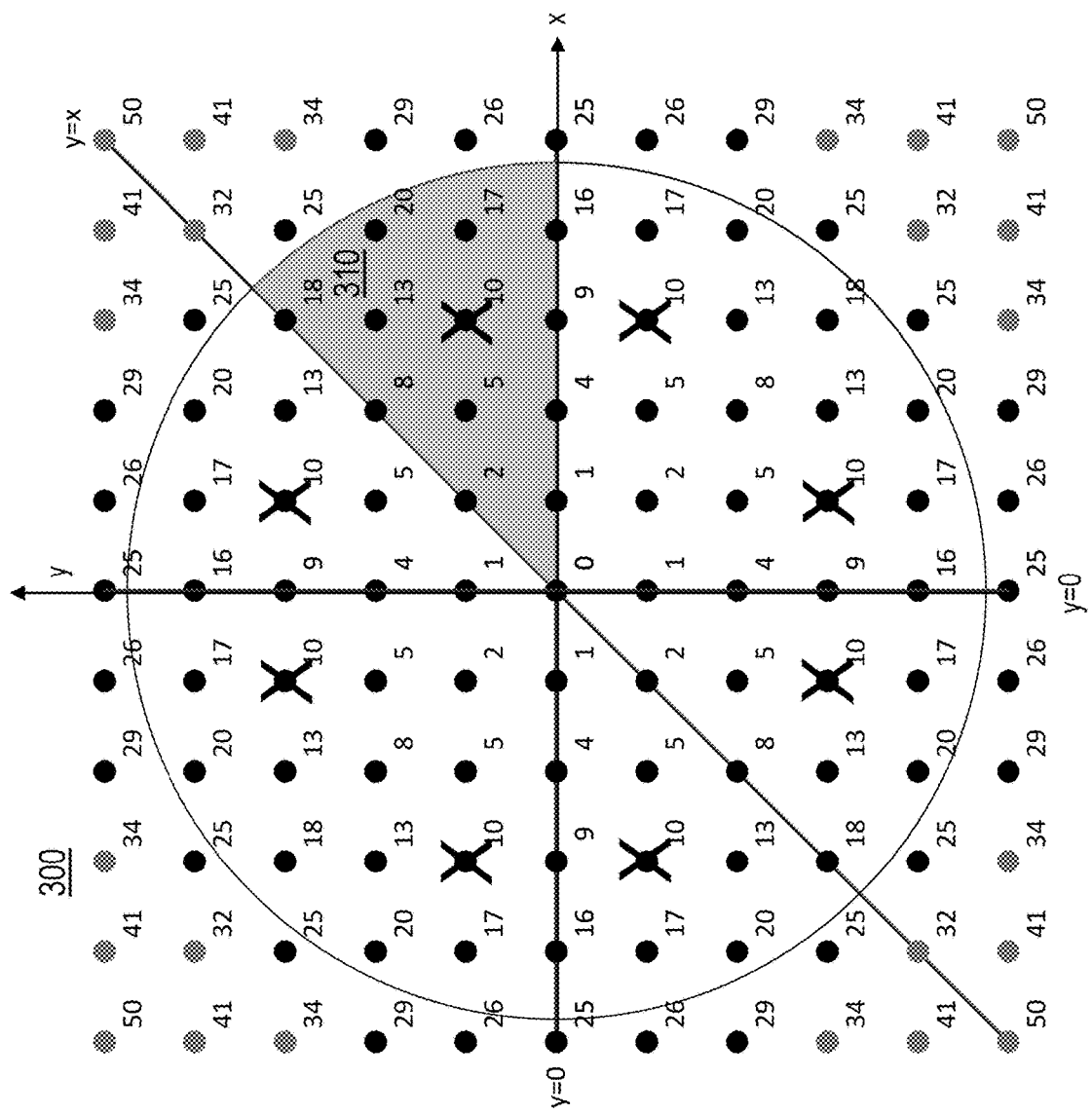
FIG. 3D illustrates that for each interior point that does not lie on the line y=0 or y=x in the reference pizza slice, the other seven interior points in symmetry can be identified in the remaining seven pizza slices.

Additionally, referring to FIG. 3D, for each interior pixel in the reference pizza slice 310, the other seven interior pixels in symmetry can be located in the remaining seven pizza slices, and their norms are the same as that of the interior pixel in the reference pizza slice 310. For example, an interior pixel at (3, 1) in the reference pizza slice 310 has the other seven interior pixels in symmetry at (1, 3), (−1, 3), (−3, 1), (−3, −1), (−1, −3) (1, −3), and (3, −1) in the remaining seven pizza slices. As the squared norm of the interior pixel at (3, 1) is 10, those of the other interior pixels in symmetry at (1, 3), (−1, 3), (−3, 1), (−3, −1), (−1, −3) (1, −3), and (3, −1) are also 10.

In some embodiments, the sorted pixels by their norms in the region of interest are stored in a lookup table. FIG. 4A illustrates an example of a full lookup table 400A containing a sequence of pixels sorted by their norms in a region of interest. As illustrated, the center pixel at (0, 0) with the squared norm of 0 is listed as the first pixel, axial pixels at (1, 0), (0, 1), (−1, 0), and (0, −1) with the squared norm of 1 are listed as the next set of pixels; diagonal pixels at (1, 1), (−1, 1), (−1, −1), and (1, −1) with the squared norm of 2 are listed as the next set of pixels, and so on and so forth. Notably, the size of the full lookup table is proportional to that of the maximal region of interest for the feature extraction application. For example, if the maximal region of interest is 50×50 to extract features, the full lookup table only needs to record up to the pixels within 50×50 boundary. As another example, the maximal region of interest is 100×100 to extract features, the full lookup table would need to record up to the pixels within 100×100 boundary.

Notably, a set of symmetric pixels have the same norm, and they are listed next to each other in the full lookup table 400A. For example, the symmetric axial points with the squared norm of 1, (1, 0), (0, 1), (−1, 0), and (0, −1), are listed next to each other. The symmetric diagonal points with the squared norm of 2, (1, 1), (−1, 1), (−1, −1), and (1, −1), are listed next to each other, which is redundant and take more storage space.

In some embodiments, only the pixels in the reference pizza slice are recorded in the reduced lookup table. Then, the computing system 110 is configured to compute the other symmetric pixels in the remaining pizza slices. FIG. 4B illustrates an example of a reduced lookup table 400B that only records pixels in the reference pizza slice based on their norms. As illustrated, the center pixel at (0, 0) with the norm of 0 is listed as the first pixel, an axial pixel at (1, 0) with the norm of 1 is listed as the second pixel, a diagonal pixel at (1, 1) with the squared norm of 2 is listed as the third pixel, and so on and so forth. Asymptotically, the reduced lookup table 400B saves the storage space eight times more than the full lookup table 400A for the same sized region of interest.

In some embodiments, a reduced lookup table is also configured to record the positions of the pixels, such as whether each pixel is a center point, an axial point, a diagonal point, or an interior point. FIG. 4C illustrates an example of a reduced lookup table 400C that not only records pixels in the reference pizza slice as those in FIG. 4B, but also records whether each of the pixel resides on the line y=x or line y=0. As illustrated, table 400C includes two additional columns "y=x" and "y=0", each of which corresponds to a Boolean value. If a point resides on the line y=x, its corresponding Boolean value is True; otherwise, its corresponding Boolean value is False. Similarly, if a point resides on the line y=0, its corresponding Boolean value is True; otherwise, its corresponding Boolean value is False. Notably, when both "y=x" and "y=0" are true, the pixel point is a center point; when "y=x" is false and "y=0" is true, the pixel point is an axial point; when "y=x" is true and "y=0" is false, the pixel point is a diagonal point; and when both "y=x" and "y=0" are false, the pixel point is an interior point. As such, the position of the pixels can be represented by two Boolean values, i.e., two bits. These Boolean values can be pre-computed and stored in the reduced lookup table 400C. Accordingly, the computing system 110 does not need to check the position of a pixel each time when traversed. The computing system 110 can simply retrieve the Boolean values of a pixel stored in the table 400C, and perform symmetric transformations based on the retrieved position of the pixel.

Once a lookup table 400A, 400B, or 400C is generated, the computing system 110 is configured to traverse each of the pixels in a region of interest based on the sequence of pixels recorded in the lookup table 400A, 400B, or 400C and determine whether it is a local feature. FIGS. 5A-5E illustrate an example of traversing each of the pixels in a region of interest in a spiral sequence, which may be obtained from a full or reduced lookup table (e.g., lookup table 400A, 400B, or 400C).

In an embodiment, the computing system 110 is configured to simply follow each of the pixel coordinates (e.g., (x, y) coordinates) in the full lookup table 400A and traverse each of the pixels in the region of interest. In the other embodiment, for each pixel in the reduced lookup table 400B or 400C, the computing system 110 is configured to identify the other symmetric pixels by the symmetric transformations and traverse them counterclockwise, clockwise, in any other predefined sequence, or in a random sequence.

Figure 5A:
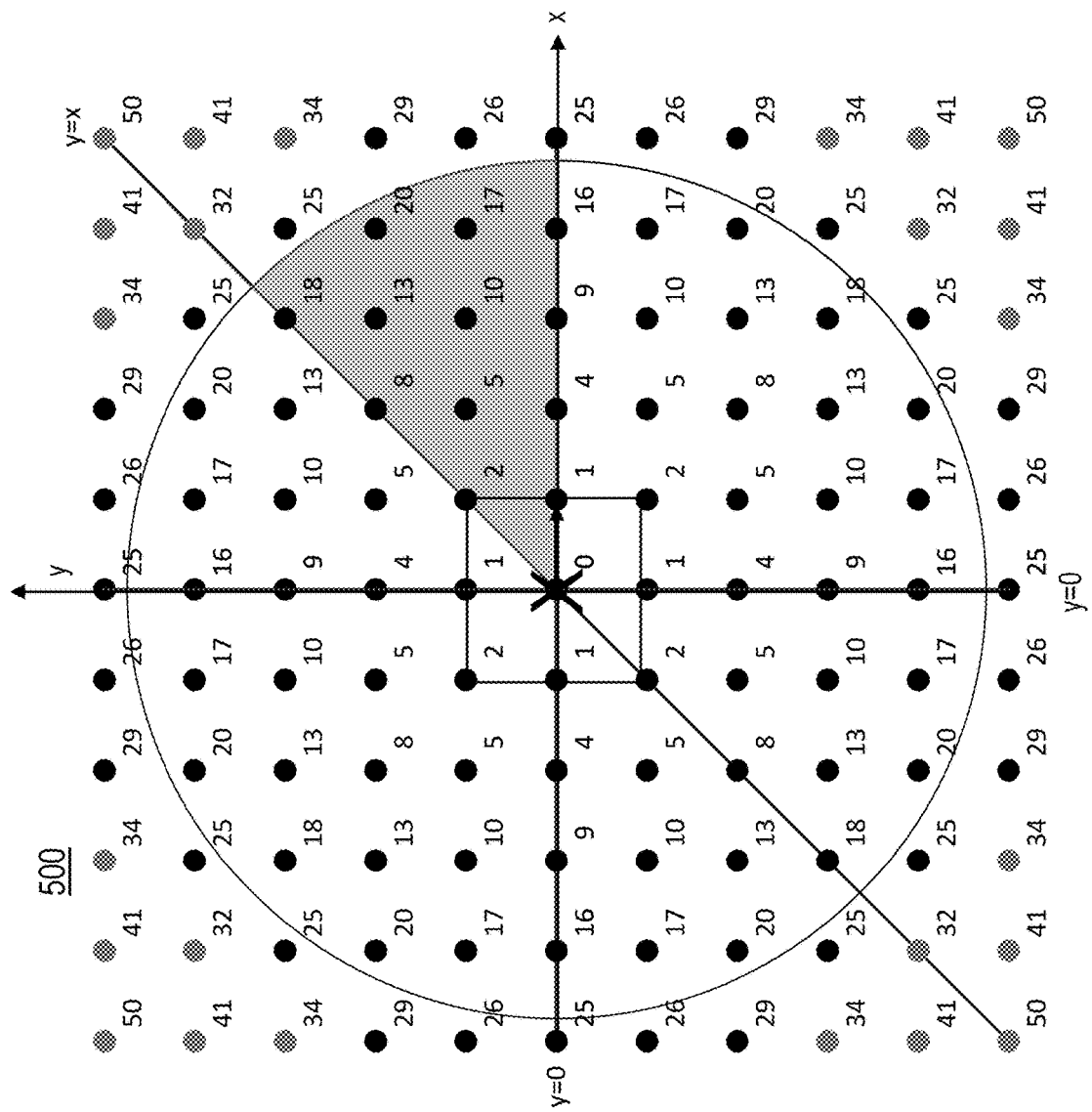
FIG. 5A illustrates that the center point (0, 0) in a region of interest is traversed to determine whether the center pixel is a local feature.

FIG. 5A illustrates that the center pixel at (0, 0) in a region of interest 500 is traversed first. When the center pixel at (0, 0) is traversed, the computing system 110 determines whether it is a local feature. For example, in some embodiments, a feature score of a pixel is compared with those of its eight adjacent pixels shown in the center square (e.g., feature scores at (1, 0), (1, 1), (0, 1), (−1, 1), (−1, 0), (−1, −1), and (0, −1)) to determine whether its feature score is smaller or larger than the other feature scores. If a feature score of a pixel is smaller or larger than those of its adjacent pixels, it is a local minimum or maximum to be a feature point.

For an off-center pixel in the reduce lookup table 400B or 400C, the computing system 110 first determines whether it is an axial, diagonal, or interior point in the reference pizza slice. For an axial or diagonal pixel of the reference pizza slice, the other three symmetric pixels are identified in the region of interest by the symmetric transformations. For an interior point of the reference pizza slice, the other seven symmetric pixels of are identified in the remaining seven pizza slices by symmetric transformations.

Figure 5B:
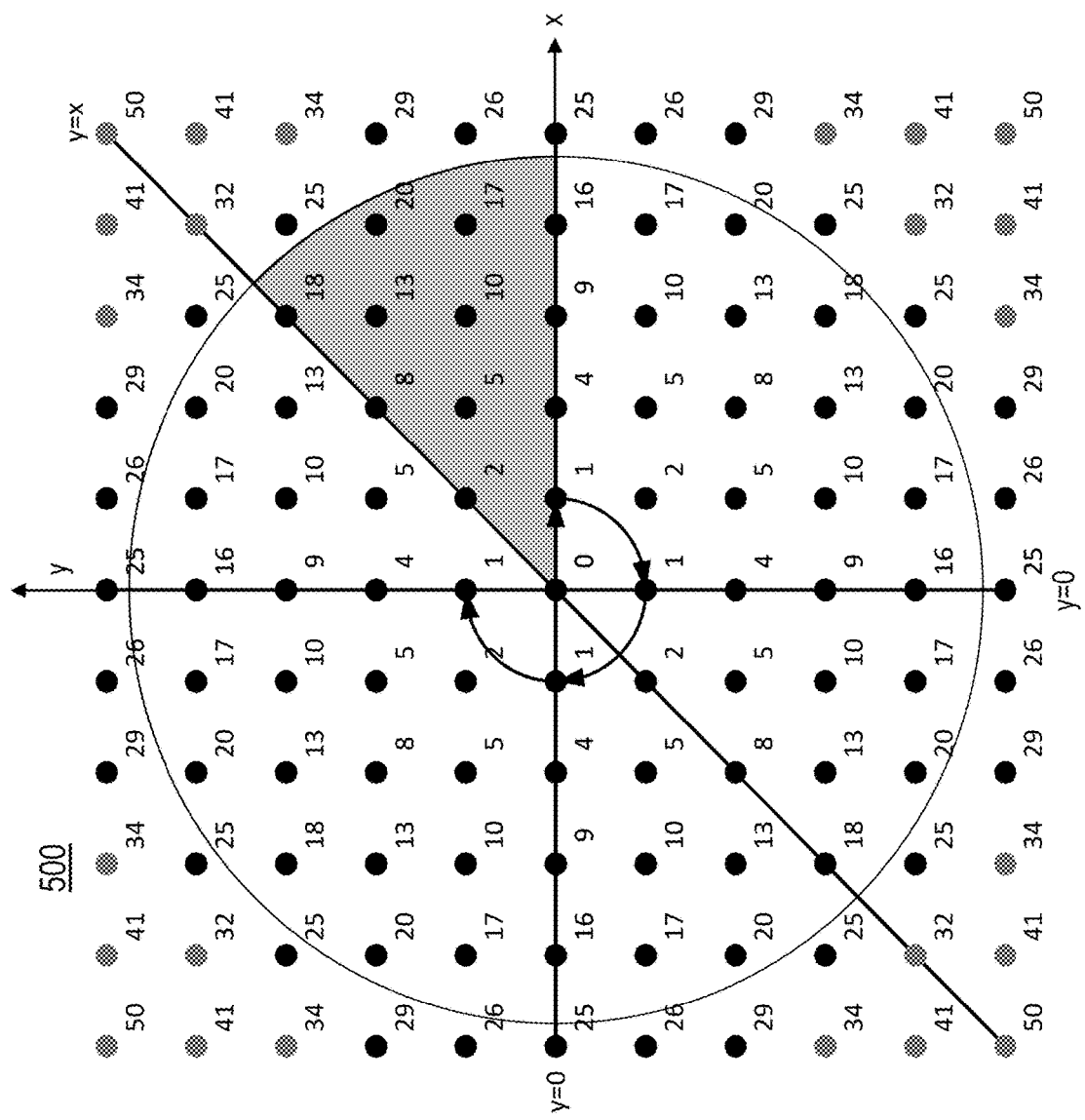
FIG. 5B illustrates that a set of four axial pixels with the squared norm of 1 are traversed to determine whether each of the axial pixels is a local feature.

FIG. 5B illustrates that a next set of axial points with the norm of 1 at (1, 0), (0, −1), (−1, 0), and (0, 1) are traversed clockwise. For an axial pixel at (1, 0) in the reduced lookup table 400B or 400C, the computing system 110 is configured to identify the other three axial pixels in symmetry.

Figure 5C:
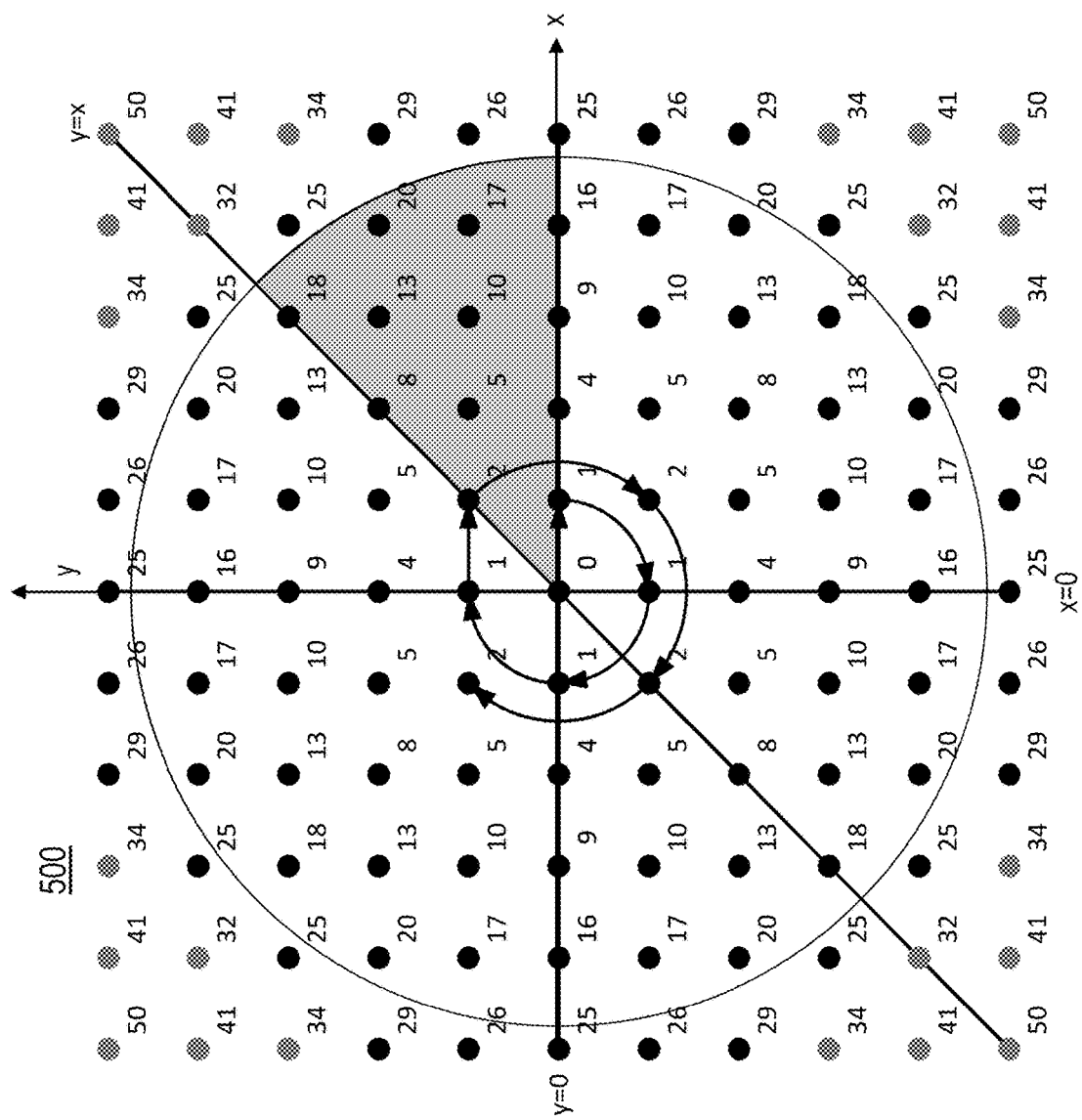
FIG. 5C illustrates that a set of four diagonal pixels with the squared norm of 2 are traversed to determine whether each of the diagonal pixels is a local feature.

FIG. 5C illustrates that a next set of diagonal pixels with the squared norm of 2 at (1, 1), (−1, 1), (−1, −1), and (1, −1) are traversed clockwise. For a diagonal pixel at (1, 1) in the reduced lookup table 400B or 400C, the computing system 110 is configured to identify the other three diagonal pixels in symmetry.

Figure 5D:
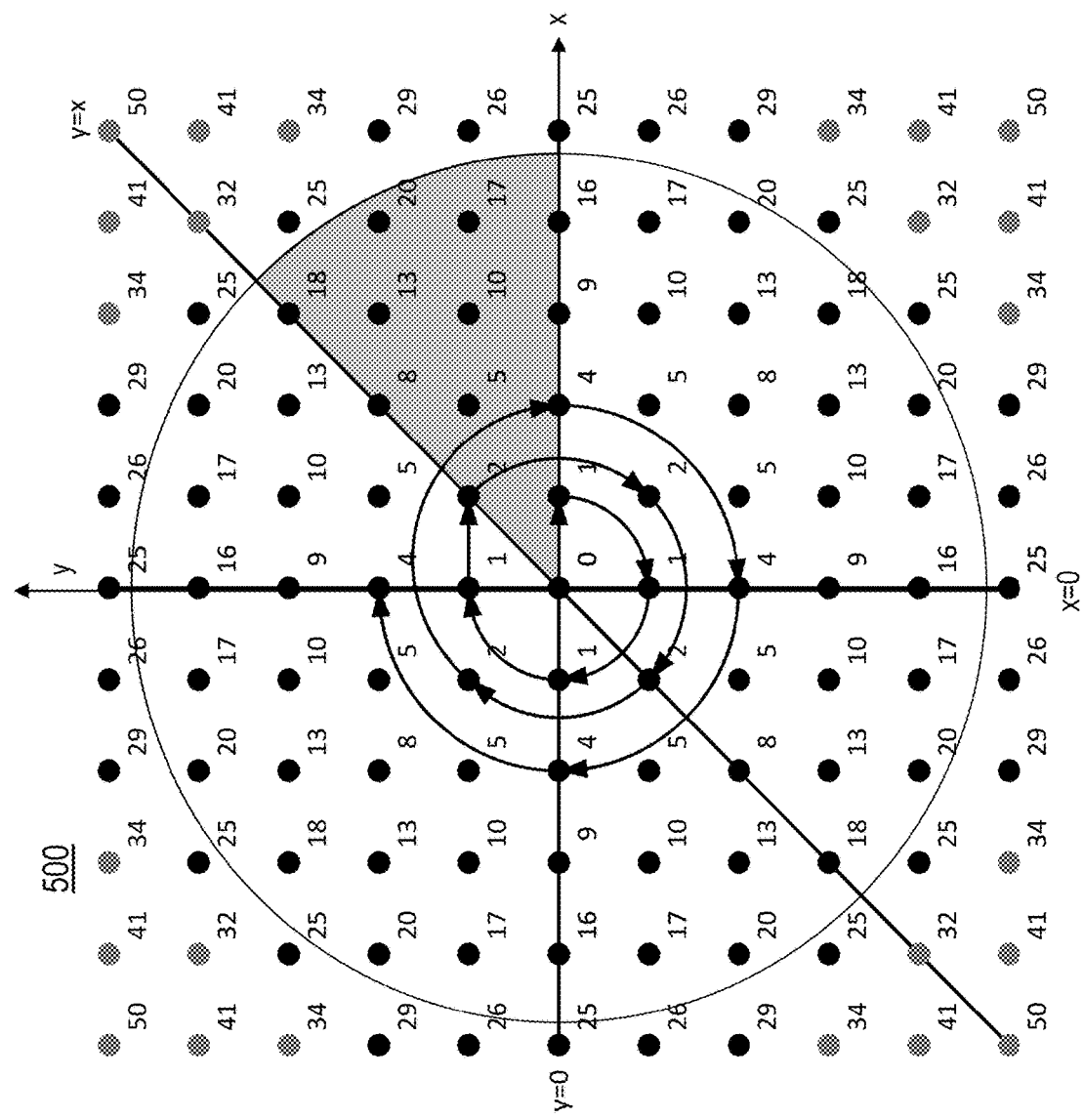
FIG. 5D illustrates that a set of four axial pixels with the squared norm of 4 are traversed to determine whether each of the axial pixels is a local feature.

FIG. 5D illustrates that a next set of axial pixels with the squared norm of 4 at (2, 0), (0, 2), (−2, 0), and (0, −2) are traversed clockwise. For an axial pixel at (2, 0) in the reduced lookup table 400B or 400C, the computing system 110 is configured to identify the other three axial pixels in symmetry.

Figure 5E:
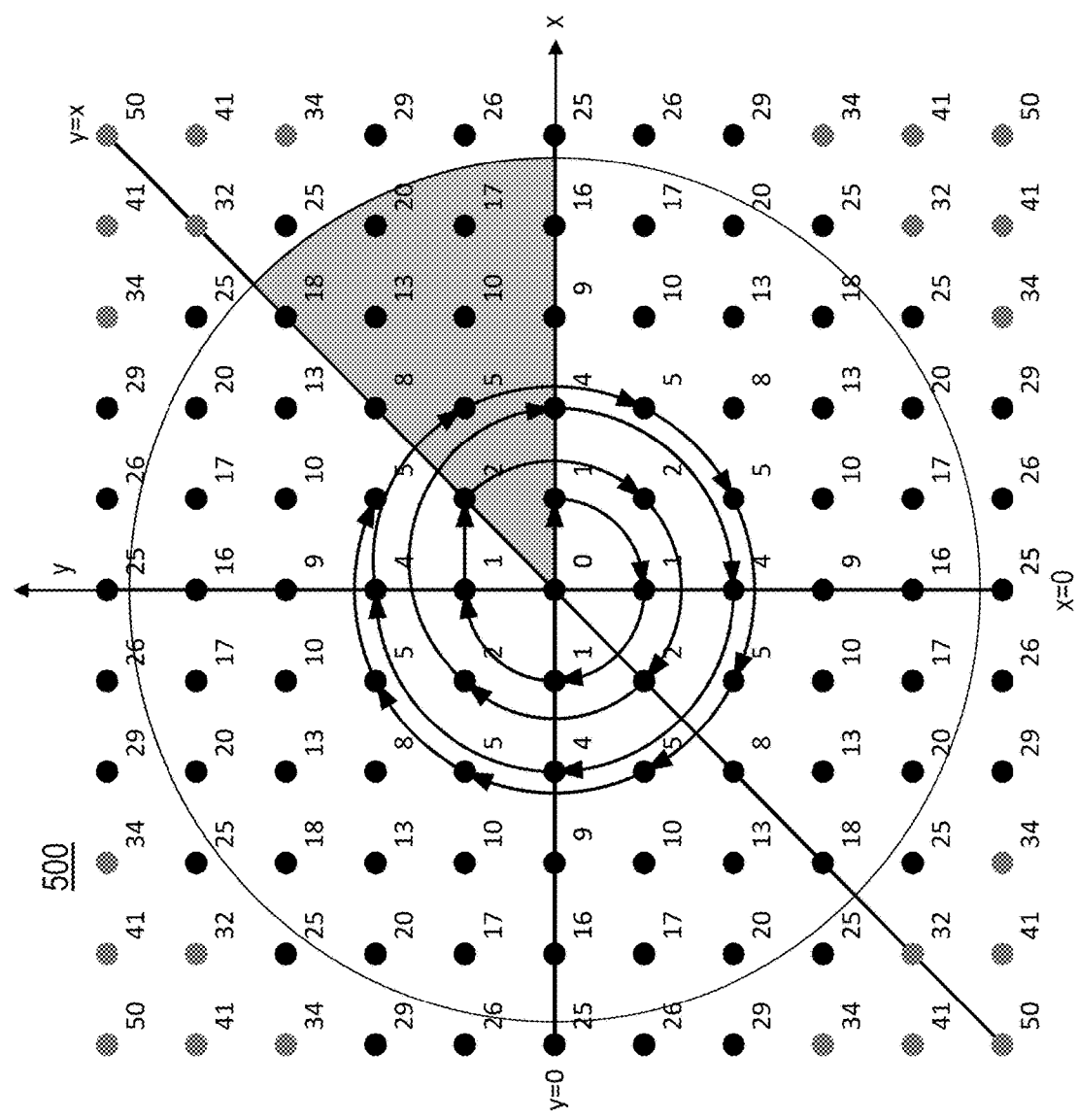
FIG. 5E illustrates that a set of eight interior pixels with the squared norm of 5 are traversed to determine whether each of the interior pixels is a local feature.

FIG. 5E illustrates that a set of interior pixels with the squared norm of 5 at (2, 1), (2, −1), (1, −2), (−1, −2), (−2, −1), (−2, 1), (−1, 2), and (1, 2) are traversed clockwise. For an interior pixel at (2, 1) in the reduced lookup table 400B or 400C, the computing system 110 is configured to identify the other seven interior pixels in symmetry.

Figure 5F:
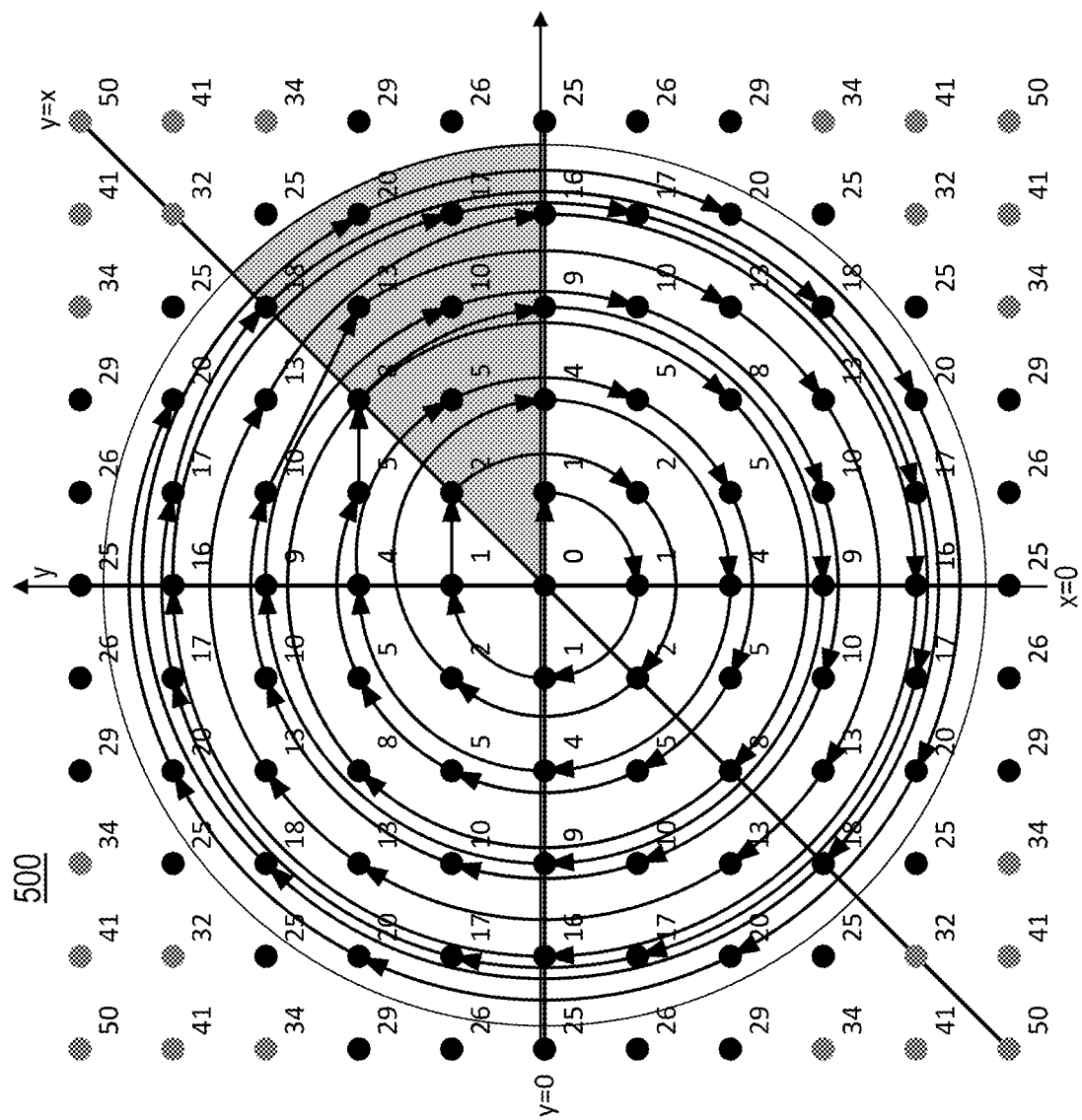
FIG. 5F illustrates that pixels with the squared norm less than 23 are traversed in a spiral sequence to identify local features in a region of interest.

This process repeats until the first local feature is detected in the region of interest. FIG. 5F illustrates an example of a spiral sequence to traverse pixels with the squared norm less than 23 in a region of interest. As illustrated, the sequence starts from the center pixel at (0, 0) and ends at the pixel at (2, 4), which looks like an outward spiral. If a feature is found before the last pixel at (2, 4) is traversed, no additional computations are necessary to traverse the rest of the region of interest 500.

It is advantageous to traverse the pixels in a region of interest in such a spiral sequence because a region of interest often contains the feature point around its center. The probabilistic concentration of the feature occurrence can be generally characterized by a normal distribution. The spiral search starts from the center of a region of interest, which significantly increases the likelihood of finding a feature a way before traversing the entire region of interest. However, the expected time of the brute-force search is the same regardless of the probabilistic distributions of feature occurrence. The expected time of the spiral search is thus improved drastically over the traditional brute-force search, which can be proved by the following computations and the results shown in FIG. 6.

In mathematics, the Gauss circle problem is the problem of determining how many integer lattice points there are in a circle of the radius R centered at the origin. The pizza slice number is defined by the number of integer lattice points in a pizza slice of the radius R centered at the origin. Given the radius R, let $N_g(R)$ be the Gauss circle number as a solution of the Gauss circle problem, $N_p(R)$ be the pizza slice number, and $\underline{N}_p(R)$ be the number of interior points in the pizza slice. The relationship between $N_g(R)$ and $\underline{N}_p(R)$ is represented by the following equation (1).

$$N_g(R) = 1 + 4\left(R + \left\lfloor \frac{R}{\sqrt{2}} \right\rfloor\right) + 8\underline{N}_p(R). \tag{1}$$

The number of interior points in the pizza slice, $\underline{N}_p(R)$, can be represented by the following equation (2).

$$\underline{N}_p(R) = \frac{1}{8}\left[N_g(R) - \left\{1 + 4\left(R + \left\lfloor \frac{R}{\sqrt{2}} \right\rfloor\right)\right\}\right]. \tag{2}$$

Therefore, the pizza slice number, $N_p(R)$, can be computed by the following equation (3).

$$N_p(R) = 1 + \left(R + \left\lfloor \frac{R}{\sqrt{2}} \right\rfloor\right) + \underline{N}_p(R). \tag{3}$$

A few Gauss circle numbers are listed here: 1, 5, 13, 29, 49, 81, 113, 149, 197, 253, 317, 377, 441, 529, 613, 709, 797, 901, 1009, 1129, 1257, 1373, 1517, 1653, 1793, 1961, 2121, 2289, 2453, 2629, 2821, 3001, 3209, 3409, 3625, 3853, 4053, 4293, 4513, 4777, 5025, 5261, 5525, 5789, 6077, 6361, 6625.

From the Gauss circle numbers above, a few pizza slice numbers are computed and listed here: 1, 2, 4, 7, 10, 15, 20, 25, 32, 40, 49, 57, 66, 78, 89, 102, 114, 128, 142, 158, 175, 190, 209, 227, 245, 267, 288, 310, 331, 354, 379, 402, 429, 455, 483, 512, 538, 569, 597, 631, 663, 693, 727, 761, 798, 834, 868.

Assuming the uniform occurrence of local optimum in a square region of interest with the integer radius R, the expected time of the brute-force search is:

$$E[T_b] = (2R)^2 \int_D p\, dD = 4R^2, \tag{4}$$

where D is the region of interest and p is the probability of the occurrences.

On the other hand, the expected time of the spiral search described herein in a circular region of the integer radius R is:

$$E[T_s] = \int_D N_g(r) p\, dD \tag{5}$$

The normal distribution in two dimensions that characterizes the probabilistic concentration of the feature occurrence:

$$p = \frac{1}{2\pi\sigma^2}\exp\left(-\frac{1}{2}\frac{x^2 + y^2}{\sigma^2}\right), \tag{6}$$

where $\sigma$ is the standard deviation of the normal distribution. The expected time of the spiral search in the polar coordinate is:

$$E[T_s] = \frac{1}{2\pi\sigma^2}\int_0^R N_g(r)\exp\left(-\frac{1}{2}\frac{r^2}{\sigma^2}\right)(2\pi r\, dr). \tag{7}$$

The Gauss circle number is approximated by the circular area:

$$N_g(r) \approx \pi r^2 \tag{8}$$

Accordingly, the expected time of the spiral search is:

$$E[T_s] \approx \frac{\sigma}{2\pi}\int_0^R \left(\frac{r}{\sigma}\right)^3 \exp\left(-\frac{1}{2}\frac{r^2}{\sigma^2}\right) dr = \frac{1}{\pi}\left[\sigma^2\left\{1 - \exp\left(-\frac{1}{2}\frac{R^2}{\sigma^2}\right)\right\} - \frac{R^2}{2}\exp\left(-\frac{1}{2}\frac{R^2}{\sigma^2}\right)\right] \tag{9}$$

By taking the ratio of the expected time of the brute force search to that of the spiral search, the computational efficiency of the spiral search is obtained in the following equation (10):

$$\frac{E[T_s]}{E[T_b]} = \frac{1}{4\pi}\left[\frac{\sigma^2}{R^2}\left\{1 - \exp\left(-\frac{1}{2}\frac{R^2}{\sigma^2}\right)\right\} - \frac{1}{2}\exp\left(-\frac{1}{2}\frac{R^2}{\sigma^2}\right)\right]. \tag{10}$$

Figure 6:
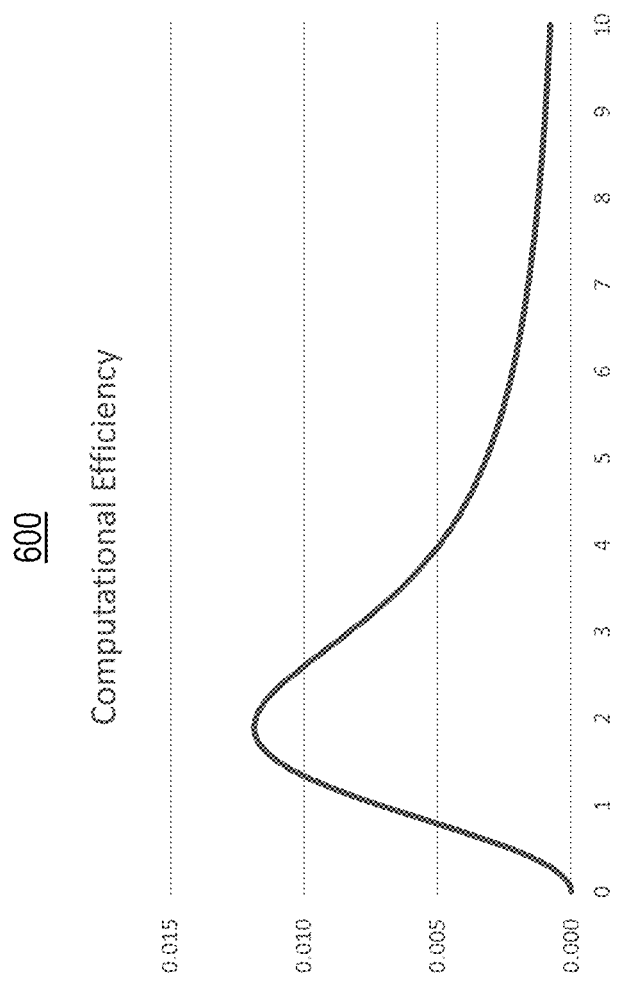
FIG. 6 illustrates a chart showing computational efficiencies of a spiral search relative to a brute-force search.

FIG. 6 illustrates a chart 600 showing the relative efficiency $$\frac{E[T_s]}{E[T_b]}$$

with respect to the scaled radius. When $R=\sigma$, the computational efficiency of the spiral search against the brute-force search is:

$$\frac{E[T_b]}{E[T_s]} \approx 139.310553426. \tag{11}$$

When $R=2\sigma$, the computational efficiency of the spiral search against the brute-force search is:

$$\frac{E[T_b]}{E[T_s]} \approx 84.6228577047. \tag{12}$$

When $R=3\sigma$, the computational efficiency of the spiral search against the brute-force search is:

$$\frac{E[T_b]}{E[T_s]} = 120.457208443. \tag{13}$$

As shown in FIG. 6, the worst case occurs when R is about $2\sigma$. Even at the worst case, the spiral search is still about 85 times faster than the brute-force search on the average.

The following example pseudo-code may be used to construct a lookup table (e.g., the lookup table 400A of FIG. 4A, the lookup table 400B of FIG. 4B, or the lookup table 400C of FIG. 4C).

```
{
    // Add all points in the half quadrant (pizza slice)
    TABLE = { }; // empty table
    int max_y = int(maxRadius / sqrt(2));
    for (int k = 0, y = 0; y <= max_y; ++y)
    {
        for (int x = y; x*x + y*y <= maxRadius*maxRadius; ++x)
        {
            TABLE[k++] = (x, y)
        }
    }
    // Sort them with respect to the distance from the center
    sort TABLE by squared sum of elements
}
```

The following example pseudo-code may be used to find the closet feature location from the center.

```
SearchFeature(
    const Image& image,
    const Vector2i& center,
    const int searchRadius)
{
    for (int k = 0; k < PizzaSliceNumbers[searchRadius]; ++k)
    {
        const Vector2i& offset = searchOffsets[k];
        if (auto featurePosition = IsFeature8(image, center, offset))
        {
            return featurePosition;
        }
    }
}
```

The following example pseudo-code may be used to search features with equal distance from the center.

```
IsFeature8(
    const Image& image,
    const Vector2i& center,
    const Vector2i& offset)
{
    const bool isZeroY = (offset.y( ) == 0);
    const bool isEqual = (offset.x( ) == offset.y( ));
    for (int i = 0; i < symmetrySizes[isZeroY][isEqual]; ++i)
    {
        // compute a point in grid that has the same distance
        from the origin
        // by flipping the offset: sign and coordinates. It is
        encoded in
symmetry Groups
        // depending on the where the offset is.
        Vector2i    position    =    center    +
symmetry Groups[isZeroY] [isEqual] [i] *offset;
        int value = int(image[position.x( ), position.y( )]);
        bool isFeature = IsFeature(image, position.x( ),
        position.y( ));
        if (isFeature)
        {
            return position;
        }
    }
    return { };
}
// Valid sizes of coefficient matrices of the offset
in symmetry Groups
static const int symmetry Sizes [2] [2] = { 8, 4, 4, 1 };
// Coefficient matrices to compute symmetric
elements from an offset.
static const Matrix2i symmetry Groups[2][2][8] =
{    // Equi-distance elements
    // [0][0][ ]: 8 equi-distance elements
    Matrix2i:: Identity ( ),
    (Matrix2i( ) << 1, 0, 0, -1).finished( ),
    (Matrix2i( ) << -1, 0, 0, 1).finished( ),
    (Matrix2i( ) << -1, 0, 0, -1).finished( ),
    (Matrix2i( ) << 0, 1, 1, 0).finished( ),
    (Matrix2i( ) << 0, 1, -1, 0).finished( ),
    (Matrix2i( ) << 0, -1, 1, 0).finished( ),
    (Matrix2i( ) << 0, -1, -1, 0).finished( ),
    // [0][1][ ]: 4 diagonal elements
    Matrix2i:: Identity ( ),
    (Matrix2i( ) << 1, 0, 0, -1).finished( ),
    (Matrix2i( ) << -1, 0, 0, 1).finished( ),
    (Matrix2i( ) << -1, 0, 0, -1).finished( ),
    // [0][1][ ]: Dummy for initialization
    Matrix2i::Zero( ),
    Matrix2i::Zero( ),
    Matrix2i::Zero( ),
    Matrix2i::Zero( ),
    // [1][0][ ]: 4 axis-aligned elements
    Matrix2i:: Identity ( ),
    (Matrix2i( ) << 0, 1, 1, 0).finished( ),
    (Matrix2i( ) << -1, 0, 0, 1).finished( ),
    (Matrix2i( ) << 0, 1, -1, 0).finished( ),
    // [1][0][ ]' Dummy for initialization
    Matrix2i::Zero( ),
    Matrix2i::Zero( ),
    Matrix2i::Zero( ),
    Matrix2i::Zero( ),
    // [1][1][ ]: Itself
    Matrix2i:: Identity( ),
}
```

As described above, the spiral search may traverse each pixel in the region of interest by the ascending order of their norm. Various norms can be employed. In an embodiment, the Euclidean norm is employed. In another embodiment, the maximum norm is employed. The maximum norm is represented by max {|x|, |y|}, where x and y are x- and y-coordinates of a pixel, respectively. In the other embodiment, the maximum norm of pixels in a region of interest are sorted and their coordinates may then be stored in a lookup table. FIG. 7A (similar to FIG. 4A) illustrates an example of a full lookup table 700A containing all pixels in the region of interest sorted by their maximum norms. In the full lookup table, the first pixel (0, 0) has the maximum norm of 0; a next set of pixels with the maximum norm of 1 include (1, 0), (0, 1), (−1, 0), (0, 1), (1, 1), (1,−1), (1, −1), and (−1, 1), and so on and so forth.

In some embodiments, only pixels in the reference pizza slice are recorded in a reduced lookup table, and the remaining symmetric pixels may be computed by its symmetric transformations. FIG. 7B (similar to FIG. 4B) illustrates an example of a reduced lookup table 700B containing only pixels in the reference pizza slice. In the reduced lookup table, the first pixel (0, 0) has the maximum norm of 0; the second set of pixels with the maximum norm of 1 include (1, 0) and (1, 1); the third set of pixels with the maximum norm of 2 include (2, 0), (2, 1), (2, 2); the fourth set of pixels with the maximum norm of 3 include (3, 0), (3, 1), (3, 2), and (3, 3); and so on and so forth. Asymptotically, the reduced lookup table 700B saves the storage space eight times more than the full lookup table 700A for the same sized region of interest.

FIG. 7C (similar to FIG. 4C) illustrates an example of a reduced lookup table 700C containing not only the pixels in the reference pizza slice, but also their positions, such as whether each point is a center point, an axial point, a diagonal point, or an interior point. Similar to FIG. 4C, the positions of the pixel points in table 700C can also be represented by two Boolean values, one of which represents whether the pixel resides on line y=x, and the other one of which represents whether the pixel resides on line y=0. When both "y=x" and "y=0" are true, the pixel point is a center point; when "y=x" is false and "y=0" is true, the pixel point is an axial point; when "y=x" is true and "y=0" is false, the pixel point is a diagonal point; and when both "y=x" and "y=0" are false, the pixel point is an interior point.

Figure 8:
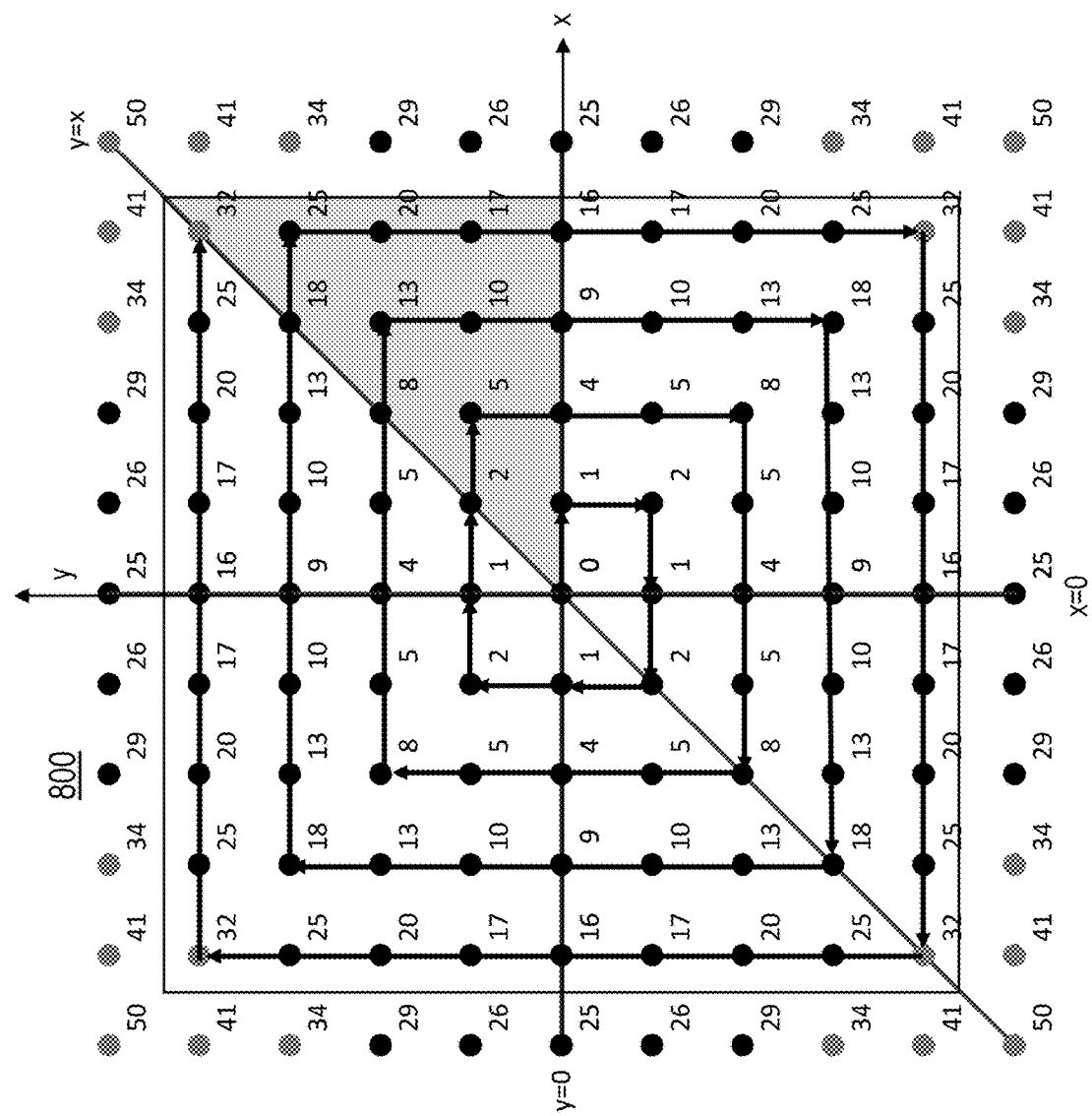
FIG. 8 illustrates an example of a Manhattan spiral sequence to traverse pixels in a region of interest based on their maximum norms.

FIG. 8 illustrates an example of a Manhattan spiral sequence 800 to traverse pixels in a region of interest based on their maximum norms (which may be recorded in a lookup table 700A, 700B, or 700C). Hereinafter, the spiral search based on the maximum norm is also referred to as "Manhattan spiral search." The Manhattan spiral search starts from the center pixel at (0, 0) and ends at the pixel at (5, 5), which also looks like an outward spiral in Manhattan. Notably, the Manhattan spiral sequence shown in FIG. 8 is different from the spiral sequence shown in FIG. 5F.

Similar to the spiral sequence shown in FIGS. 5A-5F, the Manhattan spiral search shown in FIG. 8 can also be proved to significantly improve its computational efficiencies over the brute-force search, which will not be further discussed.

The following discussion now refers to a number of methods and method acts that may be performed. Although the method acts may be discussed in a certain order or illustrated in a flowchart as occurring in a particular order, no particular ordering is required unless specifically stated, or required because an act is dependent on another act being completed prior to the act being performed.

Figure 9:
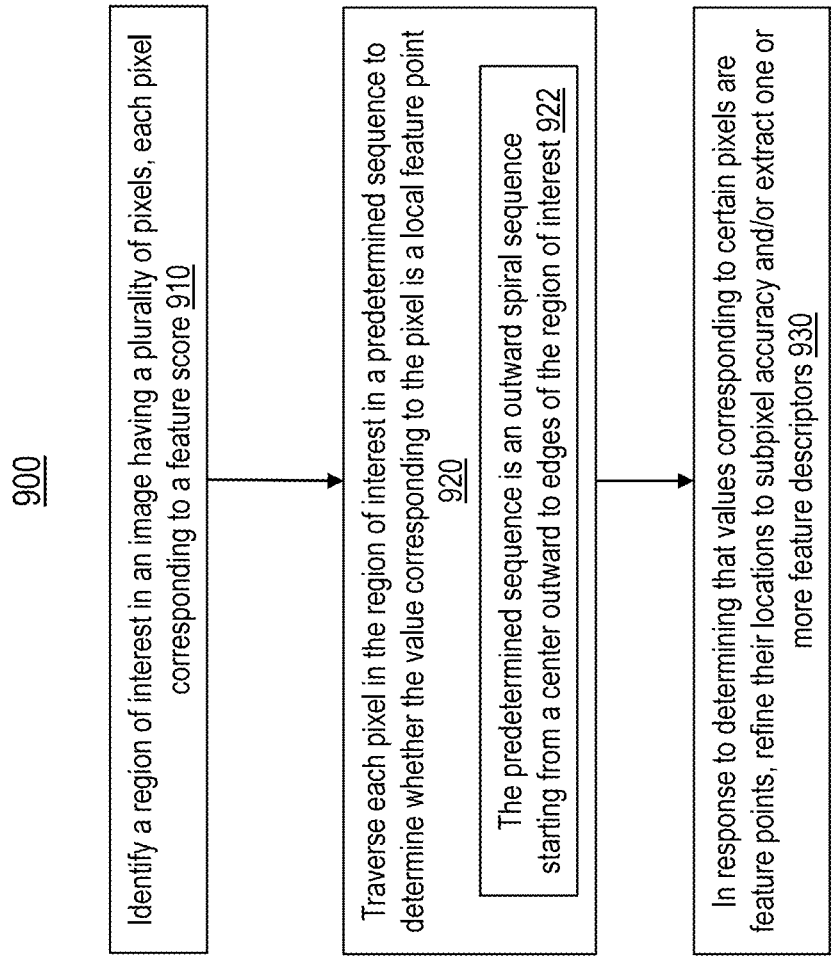
FIG. 9 illustrates a flowchart of an example method to traverse pixels in a region of interest based on a spiral sequence.

FIG. 9 illustrates a flowchart of an example method 900 to traverse pixels in a region of interest in a spiral sequence to identify local features. Method 900 includes identifying a region of interest having a plurality of pixels in an image, each of which corresponds to a feature score (act 910). The method 900 also includes traversing each pixel in the region of interest in a predefined sequence to determine whether it is a local feature based on the feature scores in its neighborhood (act 920). In some embodiments, the predefined sequence is an outward spiral sequence starting from the center outward to the edges of the region of interest (act 922). The method 900 also includes, in response to determining that certain pixels are one or more features based on their feature scores, refining their locations to subpixel accuracy and/or extracting one or more feature descriptors at feature points (act 930).

Figure 10:
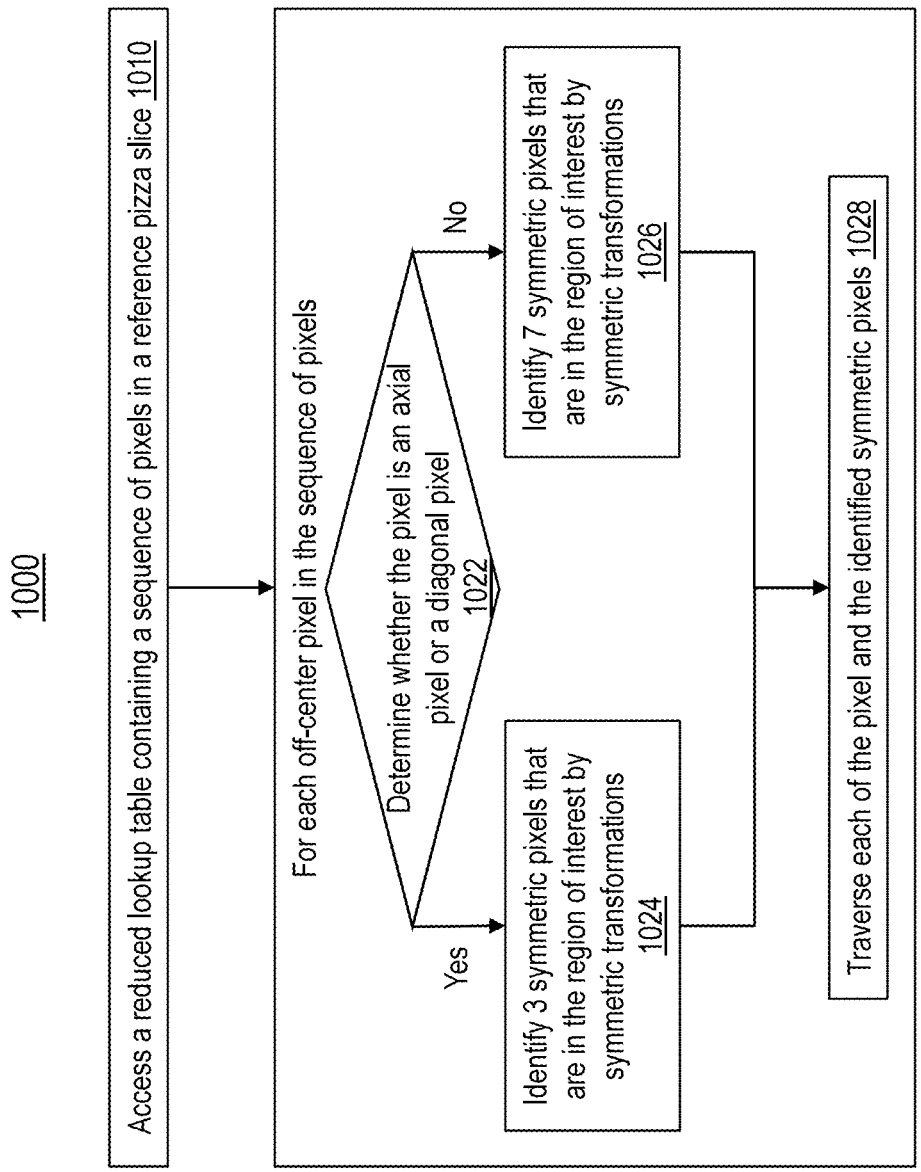
FIG. 10 illustrates a flowchart of an example method to generate a full spiral sequence based on a lookup table containing only a sequence of pixels in the reference pizza slice.

FIG. 10 illustrates a flowchart of an example method 1000 to generate a full spiral sequence based on a reduced lookup table containing only a sequence of pixels in a reference pizza slice. The method 1000 includes accessing a reduced lookup table containing a sequence of pixels in the reference pizza slice (act 1010). The method 1000 also includes, for each off-center pixel in the sequence, determining whether it is an axial or diagonal pixel (act 1022). For an axial or diagonal pixel of the reference pizza slice, the other three symmetric pixels are identified in the region of interest by the symmetric transformations (act 1024). The three additional pixels are symmetric about x-axis, y-axis, line y=x, or line y=−x to the axial or diagonal pixel in the pizza slice.

For an interior point of the reference pizza slice, the other seven symmetric pixels are identified in the remaining seven pizza slices by symmetric transformations (act 1026). The other seven interior pixels are symmetric about x-axis, y-axis, lines y=x, or y=−x to the pixel in the reference pizza slice. The method 1000 further includes traversing each of the interior pixels in symmetry to determine whether it is a local feature (act 1028).

Notably, when the reduced lookup table 400C of FIG. 4C or lookup table 700C of FIG. 7C is implemented, the Boolean values corresponding to y=x and y=0 indicate whether each pixel is a center pixel, an axial pixel, a diagonal pixel, and/or an interior pixel. In such a case, the act 1022 may be omitted. Based on the Boolean values recorded in the reduced lookup table 400C or 700C, the computing system 110 can directly compute 3 or 7 symmetric pixels by symmetric transformations.

Figure 11:
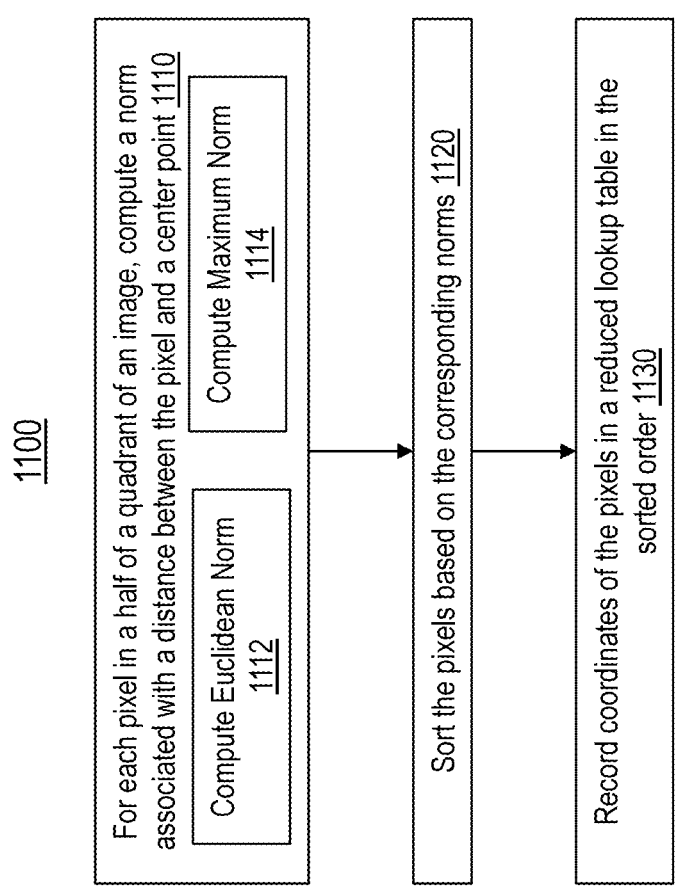
FIG. 11 illustrates a flowchart of an example method to generate a reduced lookup table containing a sequence of pixels in the reference pizza slice.

FIG. 11 illustrates a flowchart of an example method 1100 to generate a reduced lookup table containing a sequence of pixels in a reference pizza slice. The method 1100 includes computing the norm of each pixel in the reference pizza slice (act 1110). In an embodiment, the Euclidean norm (act 1112) or maximum norm (act 1114) is employed. The method 1100 further includes sorting the pixels by their norms (act 1120) and recording their coordinates in a reduced lookup table in the sorted order (act 1130).

Finally, because the principles described herein may be performed in the context of a computing system (for example, the computing system 110 may include one or more computing systems, and the lookup tables 400A, 400B, 400C, 700A, 700B, 700C may be computed by one or more computing systems) some introductory discussion of a computing system will be described with respect to FIG. 12.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 12, in its most basic configuration, a computing system 1200 typically includes at least one hardware processing unit 1202 and memory 1204. The processing unit 1202 may include a general-purpose processor and may also include a field-programmable gate array (FPGA), an application-specific integrated circuit (ASIC), or any other specialized circuit. The memory 1204 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1200 also has thereon multiple structures often referred to as an "executable component". For instance, memory 1204 of the computing system 1200 is illustrated as including executable component 1206. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component."

The term "executable component" is also well understood by one of ordinary skill as including structures, such as hardcoded or hardwired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine," or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hardwired logic gates. The computer-executable instructions (and the manipulated data) may be stored in the memory 1204 of the computing system 1200. Computing system 1200 may also contain communication channels 1208 that allow the computing system 1200 to communicate with other computing systems over, for example, network 1210.

While not all computing systems require a user interface, in some embodiments, the computing system 1200 includes a user interface system 1212 for use in interfacing with a user. The user interface system 1212 may include output mechanisms 1212A as well as input mechanisms 1212B. The principles described herein are not limited to the precise output mechanisms 1212A or input mechanisms 1212B, as such, will depend on the nature of the device. However, output mechanisms 1212A might include, for instance, speakers, displays, tactile output, holograms, and so forth. Examples of input mechanisms 1212B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, handheld devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 1200 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 1202 and memory 1204, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable storage devices having stored thereon computer-executable instructions that are structured such that, when executed by the one or more processors, configure the computing system to perform at least:
identify a region of interest in an image having a plurality of pixels, each of the plurality of pixels corresponding to a feature score, the region of interest being a section of the image where feature points reside;
store a subset of the plurality of pixels in a lookup table, and without storing all of the plurality of pixels in the lookup table, the subset of the plurality of pixels comprising pixels in a pizza slice of a single quadrant of the region of interest;
generate a spiral sequence of the plurality of pixels from the stored subset of the plurality of pixels and by sorting the plurality of pixels in a sequence of relative coordinates in the region of interest by norms representing a distance between each pixel in the plurality of pixels and a center point of the region of interest; and
traverse pixels in the region of interest in the spiral sequence starting from the center point of the region of interest to edges of the region of interest to determine whether the corresponding pixel is a feature point.

2. The computing system of claim 1, wherein each norm is a Euclidian norm whose square is equal to $x^2+y^2$ of a corresponding pixel, where x and y are x and y coordinates of the corresponding pixel relative to the center point of the region of the interest, respectively.

3. The computing system of claim 1, wherein each norm is a maximum norm that is equal to $\max\{|x|, |y|\}$ of a corresponding pixel, where x and y are x and y coordinates of the corresponding pixel relative to the center point of the region of the interest, respectively.

4. The computing system of claim 1, wherein for each axial pixel or diagonal pixel in the reference pizza slice other than the center point of the region of interest that lies on x-axis, y-axis, line y=x, or line y=−x, three symmetric pixels to the corresponding pixel are identified to generate the spiral sequence, and
wherein for each interior pixel in the reference pizza slice that is not located on x-axis, y-axis, line y=x, or line y=−x, seven symmetric pixels to the corresponding pixel are identified to generate the spiral sequence.

5. The computing system of claim 4, wherein for each pixel in the lookup table, the lookup table further stores a first Boolean value representing whether the corresponding pixel lies on the line y=0, and a second Boolean value representing whether the corresponding pixel lies on the line y=x, and
wherein the first Boolean value and the second Boolean value indicate whether each pixel is a center point, an axial point, a diagonal point, or an interior point.

6. A method implemented at a computing system for identifying local features in an image for feature detection, the method comprising:
identify a region of interest in an image having a plurality of pixels, each of the plurality of pixels corresponding to a feature score, the region of interest being a section of the image where feature points reside;
store a subset of the plurality of pixels in a lookup table, and without storing all of the plurality of pixels in the lookup table, the subset of the plurality of pixels comprising pixels in a pizza slice of a single quadrant of the region of interest;

generate a spiral sequence of the plurality of pixels from the stored subset of the plurality of pixels and by sorting the plurality of pixels in a sequence of relative coordinates in the region of interest by norms representing a distance between each pixel in the plurality of pixels and a center point of the region of interest; and traverse pixels in the region of interest in the spiral sequence starting from the center point of the region of interest to edges of the region of interest to determine whether the corresponding pixel is a feature point.

7. The method of claims 6, wherein each norm is a Euclidian norm whose square is equal to $x^2+y^2$ of a corresponding pixel, where x and y are x and y coordinates of the corresponding pixel relative to the center of the region of the interest, respectively.

8. The method of claim 6, wherein each norm is a maximum norm that is equal to max {|x|, |y|} of a corresponding pixel, where x and y are x and y coordinates of the corresponding pixel relative to the center of the region of the interest, respectively.

9. The method of claim 6, wherein for each axial pixel or diagonal pixel in the reference pizza slice other than the center point of the region of interest that lies on x-axis, y-axis, line y=x, or line y=−x, three symmetric pixels to the corresponding pixel are identified to generate the spiral sequence, and wherein for each interior pixel in the reference pizza slice that is not located on x-axis, y-axis, line y=x, or line y=−x, seven symmetric pixels to the corresponding pixel are identified to generate the spiral sequence.

10. The method of claim 9, wherein for each pixel in the lookup table, the lookup table further stores a first Boolean value representing whether the corresponding pixel lies on the line y=0, and a second Boolean value representing whether the corresponding pixel lies on the line y=x, and wherein the first Boolean value and the second Boolean value indicate whether each pixel is a center point, an axial point, a diagonal point, or an interior point.

11. A computer program product comprising one or more hardware storage devices having stored thereon computer-executable instructions that are structured such that, when the computer-executable instructions are executed by one or more processors of a computing system, the computer-executable instructions configure the computing system to perform at least:

identify a region of interest in an image having a plurality of pixels, each of the plurality of pixels corresponding to a feature score, the region of interest being a section of the image where feature points reside;

store a subset of the plurality of pixels in a lookup table, and without storing all of the plurality of pixels in the lookup table, the subset of the plurality of pixels comprising pixels in a pizza slice of a single quadrant of the region of interest;

generate a spiral sequence of the plurality of pixels from the stored subset of the plurality of pixels and by sorting the plurality of pixels in a sequence of relative coordinates in the region of interest by norms representing a distance between each pixel in the plurality of pixels and a center point of the region of interest; and traverse pixels in the region of interest in the spiral sequence starting from the center point of the region of interest to edges of the region of interest to determine whether the corresponding pixel is a feature point.

12. The computing program product of claim 11, wherein each norm is a Euclidian norm whose square is equal to $x^2+y^2$ of a corresponding pixel, where x and y are x and y coordinates of the corresponding pixel relative to the center point of the region of the interest, respectively.

\* \* \* \* \*